(12) United States Patent
Raghavan et al.

(10) Patent No.: US 10,721,039 B2
(45) Date of Patent: Jul. 21, 2020

(54) METHODS TO SCHEDULE MULTIPLE USERS FOR REFERENCE SIGNAL TRANSMISSIONS IN MILLIMETER WAVE SYSTEMS

(71) Applicant: QUALCOMM Incorporated, San Diego, CA (US)

(72) Inventors: Vasanthan Raghavan, West Windsor Township, NJ (US); Miguel Rodrigo Castellanos Llorca, West Lafayette, IN (US); Jung Ryu, Fort Lee, NJ (US); Sundar Subramanian, San Diego, CA (US); Juergen Cezanne, Ocean Township, NJ (US); Junyi Li, Chester, NJ (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 15/996,811

(22) Filed: Jun. 4, 2018

(65) Prior Publication Data

US 2018/0367270 A1 Dec. 20, 2018

Related U.S. Application Data

(60) Provisional application No. 62/520,493, filed on Jun. 15, 2017.

(51) Int. Cl.
*H04L 5/00* (2006.01)
*H04W 72/04* (2009.01)
(Continued)

(52) U.S. Cl.
CPC .......... *H04L 5/0048* (2013.01); *H04B 7/0617* (2013.01); *H04B 7/0632* (2013.01);
(Continued)

(58) Field of Classification Search
CPC ... H04L 5/0048; H04L 5/0053; H04B 7/0617; H04W 72/12; H04W 16/28
See application file for complete search history.

(56) References Cited

U.S. PATENT DOCUMENTS

2010/0189002 A1 7/2010 Choi et al.
2013/0223251 A1 8/2013 Li et al.
(Continued)

OTHER PUBLICATIONS

CMCC: "Discussion and Evaluation on Spatial-Based and Panel-Based MU-MIMO Transmission Schemes", 3GPP Draft; R1-1705098, 3rd Generation Partnership Project (3GPP), Mobile Competence Centre, 650, Route Des Lucioles, F-06921, Sophia-Antipolis Cedex; France, vol. RAN WG1, Spokane, USA; Apr. 3, 2017-Apr. 7, 2017, Apr. 2, 2017 (Apr. 2, 2017), XP051243229, 5 pages, Retrieved from the Internet: URL: http://www.3gpp.org/ftp/Meetings_3GPP_SYNC/RAN1/Docs/ [retrieved on Apr. 2, 2017].
(Continued)

*Primary Examiner* — Mohammad S Anwar
(74) *Attorney, Agent, or Firm* — Holland & Hart LLP

(57) ABSTRACT

Methods, systems, and devices for wireless communication are described. A user equipment (UE) may identify a first set of transmit beams and an associated first set of receive beams having a channel characteristic that is below a first threshold. The UE may identify, for each receive beam in the first set of receive beams, a transmit beam in a second set of transmit beams having a channel characteristic above a second threshold. The UE may identify a relative channel characteristic value between each transmit beam in the first set of transmit beams and each transmit beam in the second set of transmit beams. The UE may transmit a message that identifies the beams in the first and second set of transmit beams, the identified receive beam from the first set of receive beams for each beam in the first set of transmit beams, and the relative channel characteristic value.

16 Claims, 15 Drawing Sheets

(51) Int. Cl.
 H04W 72/12 (2009.01)
 H04B 7/08 (2006.01)
 H04B 7/06 (2006.01)
 H04W 16/28 (2009.01)
(52) U.S. Cl.
 CPC ........... *H04B 7/0695* (2013.01); *H04B 7/088* (2013.01); *H04B 7/0842* (2013.01); *H04L 5/0053* (2013.01); *H04W 16/28* (2013.01); *H04W 72/046* (2013.01); *H04W 72/12* (2013.01); *H04L 5/006* (2013.01)

(56) References Cited

U.S. PATENT DOCUMENTS

2014/0148182 A1   5/2014   Jeong et al.
2016/0150435 A1   5/2016   Baek et al.
2016/0337916 A1*  11/2016  Deenoo .................. H04W 8/22
2017/0251518 A1*  8/2017   Agiwal ................. H04W 24/08

OTHER PUBLICATIONS

International Search Report and Written Opinion—PCT/US2018/035980—ISA/EPO—dated Dec. 7, 2018.
CATT: "Discussion on DL Beam Management", 3GPP Draft; R1-1707475, 3rd Generation Partnership Project (3GPP), Mobile Competence Centre; 650, Route Des Lucioles; F-06921 Sophia-Antipolis Cedex; France, vol. RAN WG1, No. Hangzhou, China; May 15, 2017-May 19, 2017, May 14, 2017 (May 14, 2017), XP051272683, 10 pages, Retrieved from the Internet: URL: http://www.3gpp.org/ftp/Meetings_3GPP_SYNC/RAN1/Docs/ [retrieved on May 14, 2017].
Partial International Search Report—PCT/US2018/035980—ISA/EPO—dated Aug. 31, 2018.

* cited by examiner

METHODS TO SCHEDULE MULTIPLE USERS FOR REFERENCE SIGNAL TRANSMISSIONS IN MILLIMETER WAVE SYSTEMS

CROSS REFERENCES

The present Application for claims priority to U.S. Provisional Patent Application No. 62/520,493 by RAGHAVAN, et al., entitled "METHODS TO SCHEDULE MULTIPLE USERS FOR REFERENCE SIGNAL TRANSMISSIONS IN MILLIMETER WAVE SYSTEMS," filed Jun. 15, 2017, assigned to the assignee hereof.

INTRODUCTION

The following relates generally to wireless communication, and more specifically to methods to schedule multiple users for reference signal (RS) transmissions in millimeter wave (mmW) systems.

Wireless communication systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communication system may include a number of base stations or access network nodes, each simultaneously supporting communication for multiple communication devices, which may be otherwise known as user equipment (UE).

Certain wireless communication systems may operate in a mmW spectrum using beamformed transmissions. The base station and/or UE may have a number of antenna subarrays, with each subarray including multiple antennas. For example, a base station may have 8×8, 8×16, or some other large number of planar antenna subarrays and the UE may have 2, 4, 8, etc., antenna subarrays. The base station and/or UE may use analog/digital steering to direct transmission beams in a particular direction, in a particular shape, etc. At the receiving end, the antenna subarrays may also be configured to optimally receive the transmissions, e.g., may have optimal or best receive beams. In some aspects, having multiple antenna subarrays may support multi-user multiple-input/multiple-output (MU-MIMO) transmissions where the base station transmits signals to multiple UEs within its coverage area.

SUMMARY

A method of wireless communication is described. The method may include identifying a first set of transmit beams and an associated first set of receive beams having a channel characteristic that is below a first threshold, identifying, for each receive beam in the first set of receive beams, a transmit beam in a second set of transmit beams having a channel characteristic above a second threshold, identifying a relative channel characteristic value between each transmit beam in the first set of transmit beams and each transmit beam in the second set of transmit beams, and transmitting a message that identifies the beams in the first and second set of transmit beams, the identified receive beam from the first set of receive beams for each beam in the first set of transmit beams, and the relative channel characteristic value.

An apparatus for wireless communication is described. The apparatus may include means for identifying a first set of transmit beams and an associated first set of receive beams having a channel characteristic that is below a first threshold, means for identifying, for each receive beam in the first set of receive beams, a transmit beam in a second set of transmit beams having a channel characteristic above a second threshold, means for identifying a relative channel characteristic value between each transmit beam in the first set of transmit beams and each transmit beam in the second set of transmit beams, and means for transmitting a message that identifies the beams in the first and second set of transmit beams, the identified receive beam from the first set of receive beams for each beam in the first set of transmit beams, and the relative channel characteristic value.

Another apparatus for wireless communication is described. The apparatus may include a processor, memory in electronic communication with the processor, and instructions stored in the memory. The instructions may be operable to cause the processor to identify a first set of transmit beams and an associated first set of receive beams having a channel characteristic that is below a first threshold, identify, for each receive beam in the first set of receive beams, a transmit beam in a second set of transmit beams having a channel characteristic above a second threshold, identify a relative channel characteristic value between each transmit beam in the first set of transmit beams and each transmit beam in the second set of transmit beams, and transmit a message that identifies the beams in the first and second set of transmit beams, the identified receive beam from the first set of receive beams for each beam in the first set of transmit beams, and the relative channel characteristic value.

A non-transitory computer readable medium for wireless communication is described. The non-transitory computer-readable medium may include instructions operable to cause a processor to identify a first set of transmit beams and an associated first set of receive beams having a channel characteristic that is below a first threshold, identify, for each receive beam in the first set of receive beams, a transmit beam in a second set of transmit beams having a channel characteristic above a second threshold, identify a relative channel characteristic value between each transmit beam in the first set of transmit beams and each transmit beam in the second set of transmit beams, and transmit a message that identifies the beams in the first and second set of transmit beams, the identified receive beam from the first set of receive beams for each beam in the first set of transmit beams, and the relative channel characteristic value.

Some examples of the method, apparatus, and non-transitory computer-readable medium described above may further include processes, features, means, or instructions for identifying a third set of transmit beams having a channel characteristic that may be above the first threshold and below a third threshold, the third threshold being lower than the second threshold. Some examples of the method, apparatus, and non-transitory computer-readable medium described above may further include processes, features, means, or instructions for identifying the relative channel characteristic value from a beam in the third set of transmit beams and each beam in the second set of transmit beams.

Some examples of the method, apparatus, and non-transitory computer-readable medium described above may further include processes, features, means, or instructions for identifying a threshold value associated with the relative channel characteristic value. Some examples of the method, apparatus, and non-transitory computer-readable medium described above may further include processes, features, means, or instructions for identifying the relative channel characteristic based at least in part on the threshold value.

Some examples of the method, apparatus, and non-transitory computer-readable medium described above may further include processes, features, means, or instructions for transmitting the message that further identifies the beams in the third set of transmit beams and, for each beam, an associated channel characteristic.

In some examples of the method, apparatus, and non-transitory computer-readable medium described above, the channel characteristic comprises one or more of a received signal reference power (RSRP), a received signal reference quality (RSRQ), a signal-to-noise ratio (SNR), a signal-to-interference-and-noise ratio (SINR), and a channel quality indicator (CQI) 6.

A method of wireless communication is described. The method may include receiving a message from a plurality of UEs, each message identifying beams in a first set of transmit beams having a channel characteristic that is below a first threshold and an associated first set of receive beams, a second set of transmit beams for each receive beam in the first set of receive beams that have a channel characteristic that is above a second threshold, and a relative channel characteristic value between each beam in the first and second sets of transmit beams, constructing, for each of the plurality of UEs, a beam pairing table comprising the first and second sets of transmit beams, the associated receive beam for each beam in the set of transmit beams, and the relative channel characteristic value, and selecting, based at least in part on the beam pairing table, a set of UEs for multi-user transmissions.

An apparatus for wireless communication is described. The apparatus may include means for receiving a message from a plurality of UEs, each message identifying beams in a first set of transmit beams having a channel characteristic that is below a first threshold and an associated first set of receive beams, a second set of transmit beams for each receive beam in the first set of receive beams that have a channel characteristic that is above a second threshold, and a relative channel characteristic value between each beam in the first and second sets of transmit beams, means for constructing, for each of the plurality of UEs, a beam pairing table comprising the first and second sets of transmit beams, the associated receive beam for each beam in the set of transmit beams, and the relative channel characteristic value, and means for selecting, based at least in part on the beam pairing table, a set of UEs for multi-user transmissions.

Another apparatus for wireless communication is described. The apparatus may include a processor, memory in electronic communication with the processor, and instructions stored in the memory. The instructions may be operable to cause the processor to receive a message from a plurality of UEs, each message identifying beams in a first set of transmit beams having a channel characteristic that is below a first threshold and an associated first set of receive beams, a second set of transmit beams for each receive beam in the first set of receive beams that have a channel characteristic that is above a second threshold, and a relative channel characteristic value between each beam in the first and second sets of transmit beams, construct, for each of the plurality of UEs, a beam pairing table comprising the first and second sets of transmit beams, the associated receive beam for each beam in the set of transmit beams, and the relative channel characteristic value, and select, based at least in part on the beam pairing table, a set of UEs for multi-user transmissions.

A non-transitory computer readable medium for wireless communication is described. The non-transitory computer-readable medium may include instructions operable to cause a processor to receive a message from a plurality of UEs, each message identifying beams in a first set of transmit beams having a channel characteristic that is below a first threshold and an associated first set of receive beams, a second set of transmit beams for each receive beam in the first set of receive beams that have a channel characteristic that is above a second threshold, and a relative channel characteristic value between each beam in the first and second sets of transmit beams, construct, for each of the plurality of UEs, a beam pairing table comprising the first and second sets of transmit beams, the associated receive beam for each beam in the set of transmit beams, and the relative channel characteristic value, and select, based at least in part on the beam pairing table, a set of UEs for multi-user transmissions.

Some examples of the method, apparatus, and non-transitory computer-readable medium described above may further include processes, features, means, or instructions for receiving the message that further identifies a third set of transmit beams having a channel characteristic above the first threshold and below a third threshold and, for each beam, an associated channel characteristic, the third threshold being lower than the second threshold, wherein the beam pairing table may be constructed based at least in part on the third set of transmit beams.

Some examples of the method, apparatus, and non-transitory computer-readable medium described above may further include processes, features, means, or instructions for identifying a threshold value associated with the relative channel characteristic value, wherein the beam pairing table may be constructed based at least in part on the threshold value.

Some examples of the method, apparatus, and non-transitory computer-readable medium described above may further include processes, features, means, or instructions for identifying UEs from the beam pairing table having a channel characteristic within a predefined threshold value, wherein the UEs may be selected in the set of UEs.

In some examples of the method, apparatus, and non-transitory computer-readable medium described above, the channel characteristic comprises one or more of a RSRP, a RSRQ, a SNR, a SINR, and a CQI.

A method of wireless communication is described. The method may include receiving, from each UE of a plurality of UEs, a message identifying a first set of transmit beams having a channel characteristic above a threshold and, for each beam in the first set of transmit beams, a channel characteristic value, identifying, for each UE and based at least in part on the first set of transmit beams and channel characteristic value, a beamforming configuration to use for communications with the UE, and partitioning the plurality of UEs into one or more groups of UEs, wherein UEs are selected for a group based on the beamforming configuration associated with each UE being within a threshold value.

An apparatus for wireless communication is described. The apparatus may include means for receiving, from each UE of a plurality of UEs, a message identifying a first set of transmit beams having a channel characteristic above a threshold and, for each beam in the first set of transmit beams, a channel characteristic value, means for identifying, for each UE and based at least in part on the first set of transmit beams and channel characteristic value, a beamforming configuration to use for communications with the UE, and means for partitioning the plurality of UEs into one or more groups of UEs, wherein UEs are selected for a group based on the beamforming configuration associated with each UE being within a threshold value.

Another apparatus for wireless communication is described. The apparatus may include a processor, memory in electronic communication with the processor, and instructions stored in the memory. The instructions may be operable to cause the processor to receive, from each UE of a plurality of UEs, a message identifying a first set of transmit beams having a channel characteristic above a threshold and, for each beam in the first set of transmit beams, a channel characteristic value, identify, for each UE and based at least in part on the first set of transmit beams and channel characteristic value, a beamforming configuration to use for communications with the UE, and partition the plurality of UEs into one or more groups of UEs, wherein UEs are selected for a group based on the beamforming configuration associated with each UE being within a threshold value.

A non-transitory computer readable medium for wireless communication is described. The non-transitory computer-readable medium may include instructions operable to cause a processor to receive, from each UE of a plurality of UEs, a message identifying a first set of transmit beams having a channel characteristic above a threshold and, for each beam in the first set of transmit beams, a channel characteristic value, identify, for each UE and based at least in part on the first set of transmit beams and channel characteristic value, a beamforming configuration to use for communications with the UE, and partition the plurality of UEs into one or more groups of UEs, wherein UEs are selected for a group based on the beamforming configuration associated with each UE being within a threshold value.

Some examples of the method, apparatus, and non-transitory computer-readable medium described above may further include processes, features, means, or instructions for selecting, based at least in part on the beamforming configuration of each UE, a UE from each group of UEs for simultaneous transmissions.

Some examples of the method, apparatus, and non-transitory computer-readable medium described above may further include processes, features, means, or instructions for refraining, based at least in part on the beamforming configuration of each UE, from selecting UEs from within a group of UEs for simultaneous transmissions.

Some examples of the method, apparatus, and non-transitory computer-readable medium described above may further include processes, features, means, or instructions for selecting, for each UE and based at least in part on the channel characteristic value, a UE from each group of UEs for simultaneous transmissions.

In some examples of the method, apparatus, and non-transitory computer-readable medium described above, the channel characteristic comprises one or more of a RSRP, a RSRQ, a SNR, a SINR, and a CQI.

In some examples of the method, apparatus, and non-transitory computer-readable medium described above, the channel characteristic comprises a transmit power associated with the beamforming configuration.

DETAILED DESCRIPTION

Figure 1:
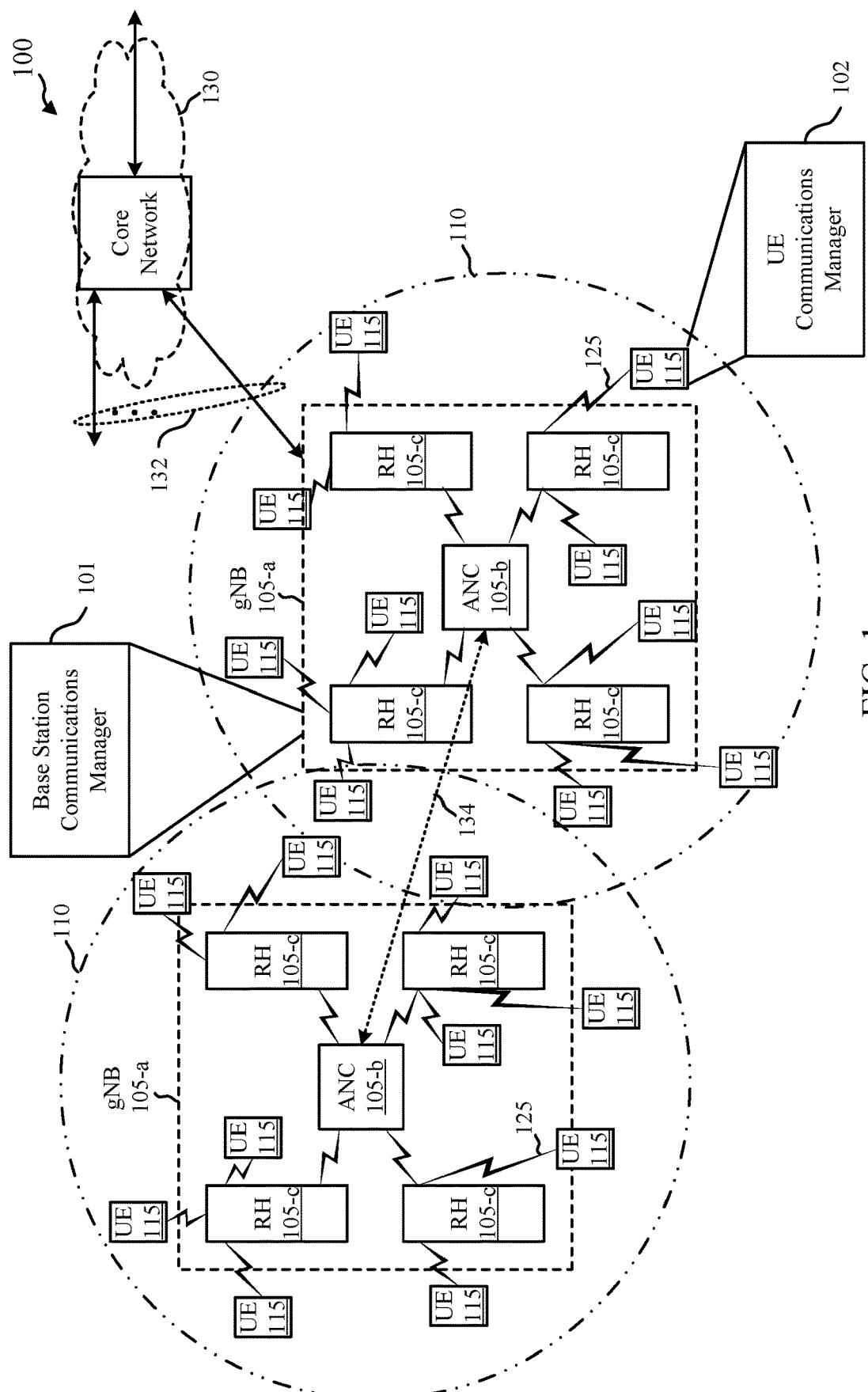
FIG. 1 illustrates an example of a system for wireless communication that supports methods to schedule multiple users for RS transmissions in mmW systems, in accordance with one or more aspects of the present disclosure.

Aspects of the disclosure are initially described in the context of a wireless communication system, e.g., a mmW wireless communication system. Aspects of the present disclosure provide a mechanism where the base station can optimize selection of UEs for such MU-MIMO transmissions, e.g., data transmissions, RS transmissions, and other transmissions. In some aspects, the described techniques leverage mmW measurement reports to schedule sets of UEs for wireless communication in a MU transmission. For example, the described techniques provide a mechanism for a base station (e.g., a next generation NodeB (gNB)) operating in a mmW wireless communication system to build a beam pairing table based on UE feedback and, also, to schedule the sets of UEs for MU transmissions based on UE grouping (or partitioning).

In some aspects, UEs operating with the coverage area of a base station may transmit feedback messages that identify or otherwise convey an indication of different sets of beams. For example, a first set of transmit beams may be indicated which may include the "worst" transmit beams, e.g., the K number of transmit beams having the lowest RSRP values. The first set of receive beams may also be indicated and associated with the first set of transmit beams. The first set of receive beams may also include the "worst" receive beams, e.g., receive beams associated with the lowest RSRP values. A second set of transmit beams may also be indicated and may include the "best" transmit beams, e.g., the transmit beams having the highest RSRP values. The UEs may also report a relative channel characteristic value between the beams in the first and second set of transmit beams. The relative channel characteristic value may refer to the difference in RSRP values, a RSRP value for a transmit beam in relation to the transmit beam having the highest RSRP value, and the like.

The base station may receive the feedback messages from the UEs within its coverage area and use the information carried or otherwise conveyed in the message to construct a beam pairing table for each reporting UE. For example, the beam pairing table may include information regarding the identified first and second sets of transmit beams, the first set of receive beams, the relative channel characteristic values, and the like. The base station may select sets of UEs for MU transmissions based on the beam pairing table.

In some aspects, a base station may also partition UEs in a codebook based on beamforming configurations for the UEs and select UEs for transmissions based on the codebook. For example, the base station may receive feedback messages from the UEs within its coverage area that identify the best transmit beams (e.g., the set(s) of transmit beams having a channel characteristic above a threshold) and their associated channel characteristic value (e.g., RSRP). The base station may use the feedback information to identify a beamforming configuration for each UE to use for communications with the UEs. The beamforming configurations may include identifying the angle of arrival in the azimuth and zenith (AoA/ZoA) and/or angle of departure in the azimuth and zenith (AoD/ZoD). The base station may assign the UEs to a codebook based on the beamforming configuration and partition the UEs into groups based on the codebook (e.g., based on the beamforming configuration). In some instances, the base station may select one UE from each group for MU transmissions, e.g., not select UEs from the same group to avoid interference.

Aspects of the disclosure are further illustrated by and described with reference to apparatus diagrams, system diagrams, and flowcharts that relate to methods to schedule multiple users for RS transmissions in mmW systems.

FIG. 1 illustrates an example of a wireless communication system 100, in accordance with one or more aspects of the present disclosure. The wireless communication system 100 includes base stations 105 (e.g., gNBs 105-a including access node controller(s) (ANC)(s) 105-b, and/or radio heads (RHs) 105-c), UEs 115, and a core network 130. In some examples, the wireless communication system 100 may be a LTE, LTE-Advanced (LTE-A) network, or a NR network. In some cases, wireless communication system 100 may support enhanced broadband communications, ultra-reliable (i.e., mission critical) communications, low latency communications, and communications with low-cost and low-complexity devices.

Base stations 105 may wirelessly communicate with UEs 115 via one or more base station antennas. Each base station 105 may provide communication coverage for a respective geographic coverage area 110. Communication links 125 shown in wireless communication system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communication system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communication system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134

(e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, Internet Protocol (IP) connectivity, and other access, routing, or mobility functions. At least some of the network devices, such as base station 105 may include subcomponents such as an access network entity 105-b, which may be an example of an access node controller (ANC). Each access network entity 105-b may communicate with a number of UEs 115 through a number of other access network transmission entities 105-c, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communication system 100 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communication system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communication system 100 may support mmW communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

MIMO wireless systems use a transmission scheme between a transmitter (e.g., a base station 105) and a receiver (e.g., a UE 115), where both transmitter and receiver are equipped with multiple antennas. Some portions of wireless communication system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communication system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid Automated Repeat Request (HARD) to provide retransmission at the MAC layer to improve link efficiency. In the control plane, the Radio Resource Control (RRC) protocol layer may provide establishment, configuration, and maintenance of an RRC connection between a UE 115 and a network device 105-c, network device 105-b, or core network 130 supporting radio bearers for user plane data. At the Physical (PHY) layer, transport channels may be mapped to physical channels.

Time intervals in LTE or NR may be expressed in multiples of a basic time unit (which may be a sampling period of $T_s=1/30,720,000$ seconds). Time resources may be organized according to radio frames of length of 10 ms ($T_f=307200T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

A resource element may consist of one symbol period and one subcarrier (e.g., a 15 KHz frequency range). A resource block may contain 12 consecutive subcarriers in the frequency domain and, for a normal cyclic prefix in each orthogonal frequency division multiplexing (OFDM) symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

Wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both frequency division duplexing (FDD) and time division duplexing (TDD) component carriers.

In some cases, wireless communication system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless communication system 100 may utilize both licensed and unlicensed radio frequency spectrum bands. For example, wireless communication system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on FDD, TDD or a combination of both.

In some aspect, a base station 105 may include a base station communications manager 101. The base station communications manager 101 may receive a message from a plurality of UEs 115, each message identifying beams in a first set of transmit beams having a channel characteristic that is below a first threshold and an associated first set of receive beams, a second set of transmit beams for each receive beam in the first set of receive beams that have a channel characteristic that is above a second threshold, and a relative channel characteristic value between each beam in the first and second sets of transmit beams. The base station communications manager 101 may construct, for each of the plurality of UEs, a beam pairing table comprising the first and second sets of transmit beams, the associated receive beam for each beam in the set of transmit beams, and the relative channel characteristic value. The base station communications manager 101 may select, based at least in part on the beam pairing table, a set of UEs for MU transmissions.

In some aspects, the base station communications manager 101 may receive, from each UE of a plurality of UEs, a message identifying a first set of transmit beams having a channel characteristic above a threshold and, for each beam in the first set of transmit beams, a channel characteristic value. The base station communications manager 101 may identify, for each UE and based at least in part on the first set of transmit beams and channel characteristic value, a beamforming configuration to use for communications with the UE. The base station communications manager 101 may partition the plurality of UEs into one or more groups of UEs, wherein UEs are selected for a group based on the beamforming configuration associated with each UE being within a threshold value.

In some aspect, a UE 115 may include a UE communications manager 102. The UE communications manager 102 may identify a first set of transmit beams and an associated first set of receive beams having a channel characteristic that is below a first threshold. The UE communications manager 102 may identify, for each receive beam in the first set of receive beams, a transmit beam in a second set of transmit beams having a channel characteristic above a second threshold. The UE communications manager 102 may identify a relative channel characteristic value between each transmit beam in the first set of transmit beams and each transmit beam in the second set of transmit beams. The UE communications manager 102 may transmit a message that identifies the beams in the first and second set of transmit beams, the identified receive beam from the first set of receive beams for each beam in the first set of transmit beams, and the relative channel characteristic value.

Figure 2:
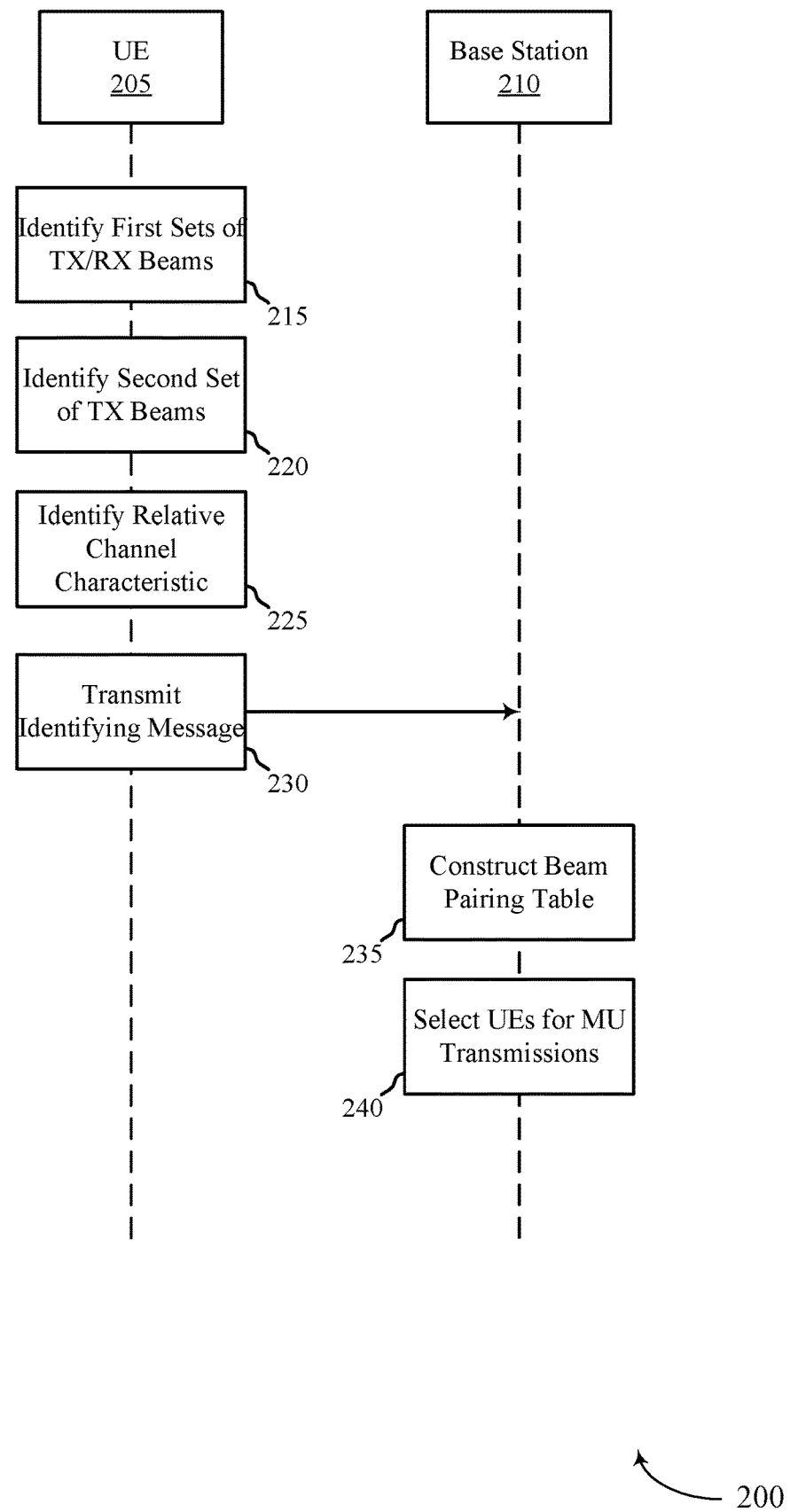
FIG. 2 illustrates an example of a process that supports methods to schedule multiple users for RS transmissions in mmW systems, in accordance with one or more aspects of the present disclosure.

FIG. 2 illustrates an example of a process 200 that supports methods to schedule multiple users for RS transmissions in mmW systems, in accordance with one or more aspects of the present disclosure. In some examples, process 200 may implement aspects of wireless communication system 100. Process 200 may include a UE 205 and a base station 210, which may be examples of the corresponding devices described herein. Generally, process 200 illustrates one example of base station 210 constructing a beam pairing table based on UE 205 feedback messages.

In some aspects, a channel between the base station 210 and the i-th UE may be denoted as $H_i$. During a beam training phase, base station 210 may use a transmit beamformer codebook with training beams $F=\{f_{Tr,1}, \ldots, f_{Tr,N}\}$. During the beam training phase, UE 205 may run though its codebook (e.g., UE-specific codebook) using beams $G_i=\{g_{Tr,1}^{(i)}, \ldots, g_{Tr,M}^{(i)}\}$. UE 205 may transmit feedback messages to base station 210 carrying or otherwise conveying beam indices $j_1^{(i)}$ that satisfy:

$$(j_1^{(i)}, k_1) = \arg \max_{j=1,\ldots,N, k=1,\ldots,M} |(g_{Tr,k}^{(i)})^H H_i f_{Tr,j}|^2$$

In some aspects, the UE 205 may feed back the top-K beam information (e.g., a set of transmit beams comprising the "best" transmit beams having the highest RSRP) along with the channel characteristic for each K beam (e.g., the RSRP value). Generally, base station 210 may use a scheduling scheme for scheduling UEs based on the feedback information (e.g., a round-robin scheduler, a proportionate fair scheduler, etc.). However, process 200 illustrates one example where UE 205 identifies additional feedback information that is used by base station 210 to construct a beam pairing table to use for scheduling MU transmissions.

At 215, UE 205 may identify the first sets of transmit and receive beams. For example, UE 205 may identify a first set of transmit beams that have a channel characteristic below a first threshold. The first set of transmit beams might be considered the "worst" transmit beams in that they have a low RSRP value, but may be suitable for wireless communications in some circumstances. UE 205 may also identify a first set of receive beams that are associated with the transmit beams in the first set of transmit beams. Being associated may refer to the receive beam configuration used by UE 205 during the beam training phase that correspond to the first set of transmit beams. In some aspects, the channel characteristic may be a RSRP, a RSRQ, a SNR, a SINR, or a CQI.

In some aspects, UE 205 may identify beam indices $\{m_1^{(i)}, m_2^{(i)}, \ldots\}$ such that:

$$|(g_{Tr,k1}^{(i)})^H H_i f_{Tr,m1(i)}|^2 \leq |(g_{Tr,k1}^{(i)})^H H_i f_{Tr,j1(i)}|^2 - \Delta_i$$
$$|(g_{Tr,k1}^{(i)})^H H_i f_{Tr,m2(i)}|^2 \leq |(g_{Tr,k1}^{(i)})^H H_i f_{Tr,j1(i)}|^2 - \Delta_i$$
$$\vdots$$

for an appropriate choice of threshold $\Delta_i$. In some aspects, beam indices $\{m_1^{(i)}, m_2^{(i)}, \ldots\}$ may be the "worst" set of beams transmit beams paired with $g_{Tr,k1}^{(i)}$ and may be captured by the associated RSRP value (e.g., channel characteristic value) below that of the best transmit beam pair by a margin of $\Delta_i$. In some aspects, UE 205 may report multiple worst beam sets for multiple choices of $\Delta_i$.

At 220, UE 205 may identify, for each receive beam in the first set of receive beams, a transmit beam in a second set of transmit beams having a channel characteristic above a second threshold. The beams in the second set of transmit beams may be the top-K set of transmit beams identified during the beam training phase, for example.

At 225, UE 205 may identify a relative channel characteristic value between each transmit beam in the first set of transmit beams (e.g., the "worst" transmit beams) and each beam in the second set of transmit beams (e.g., the "best" transmit beams). The relative channel characteristic value may refer to the difference in RSRP values between the beams in the first and second sets of transmit beams, may refer to an offset RSRP value of the beams in the first set of transmit beams with respect to the beams in the second set of beams (e.g., a number showing how many decibels below the highest RSRP value that the beams in the first set of transmit beams are), and the like.

At 230, UE 205 may transmit (and base station 210 may receive) a message that identifies the beams in the first and second sets of transmit beams, the beams in the first set of receive beams, and the relative channel characteristic value for one or more of the identified transmit/receive beams. The message may be a feedback message, in some examples. In some aspects, UE 205 may update the information conveyed in the message as channel characteristics changes. In some aspects, base station 210 may receive similar messages from multiple UEs (e.g., all or some of the UEs within the coverage area of base station 210).

In some aspects, UE 205 may identify a third set of transmit beams having a channel characteristic that is above the first threshold and below a third threshold. The third threshold may be lower than the second threshold. The UE 205 may identify the relative channel characteristic value from a beam in the third set of transmit beams and each beam in the first and second sets of transmit beams. The UE 205 may identify a threshold value (e.g., $\Delta i$) associated with the relative channel characteristic value. The UE 205 may identify the relative channel characteristic based on the threshold value. In some examples, the transmitted message may identify the beams in the third set of transmit beams.

At 235, base station 210 may construct, for each UE that base station 210 receives a feedback message from, a beam pairing table. The beam pairing table may include the first and second sets of transmit beams, the associated receive beam for each beam in the first set of transmit beams, and the relative channel characteristic value.

In some aspects, base station 210 may create a beam pairing table for all UEs in the cell. In some examples, the beam pairing table may include a User Index column identifying the UE (e.g., (i)). The beam pairing table may include a Best Tx Beam Index column identifying a beam in the second set of transmit beams (e.g., $j_1^{(i)}$). The beam pairing table may include a RSRP Associated with the Best Tx Beam column identifying the RSRP value (e.g., channel characteristic value) for the best transmit beam (e.g., $RSRP_i$). The beam pairing table may include a Worst Tx Beam Index Associated with Receive Beam Index column identifying the beams in the first set of transmit beams (e.g., $\{m_1^{(i)}, m_2^{(i)}, \ldots\}$). The beam pairing table may include a Threshold column identifying the threshold value (e.g., $\Delta_i$).

At 240, base station 210 may select, based at least in part on the beam pairing table, a set of UEs for MU transmissions. For example, base station 210 may identify UEs from the beam pairing table having a relative channel characteristic within a threshold as the set of UEs.

In one non-limiting example for a K=2 user transmission (e.g., two UE transmission), base station 210 may select the set of UEs for the MU transmission according to various schemes. As one example, base station 210 may identify a first UE (e.g., $UE_i$) with a best and worst transmit beam indices $j_1^{(i)}$ and $m_1^{(i)}$ corresponding to an appropriate receive beam index $k_1$. Base station 210 may identify a second UE (e.g., $UE_j$) with best and worst transmit beam indices being $j_1^{(j)}$ and $m_1^{(j)}$ corresponding to an appropriate receive beam index $k_2$. In this example, $RSRP_i$ and $RSRP_j$ may be comparable to each other. Base station 210 may schedule $UE_i$ and $UE_j$ as a set of UEs for a MU transmission since the interference caused by one transmit beam on the other transmit beam with the use of the appropriate receive beam is below $\Delta_i$. This may provide for $SINR_i \geq \log(\Delta_i)$ and $SINR_j \geq \log(\Delta_j)$. If base station 210 cannot find UEs matching this criteria, base station may adapt $\Delta_i$ and $\Delta_j$. In the instance where a higher K value is used, multiple UEs may meet the pairing scheme as an appropriate choice of $\Delta_i$.

Figure 3:
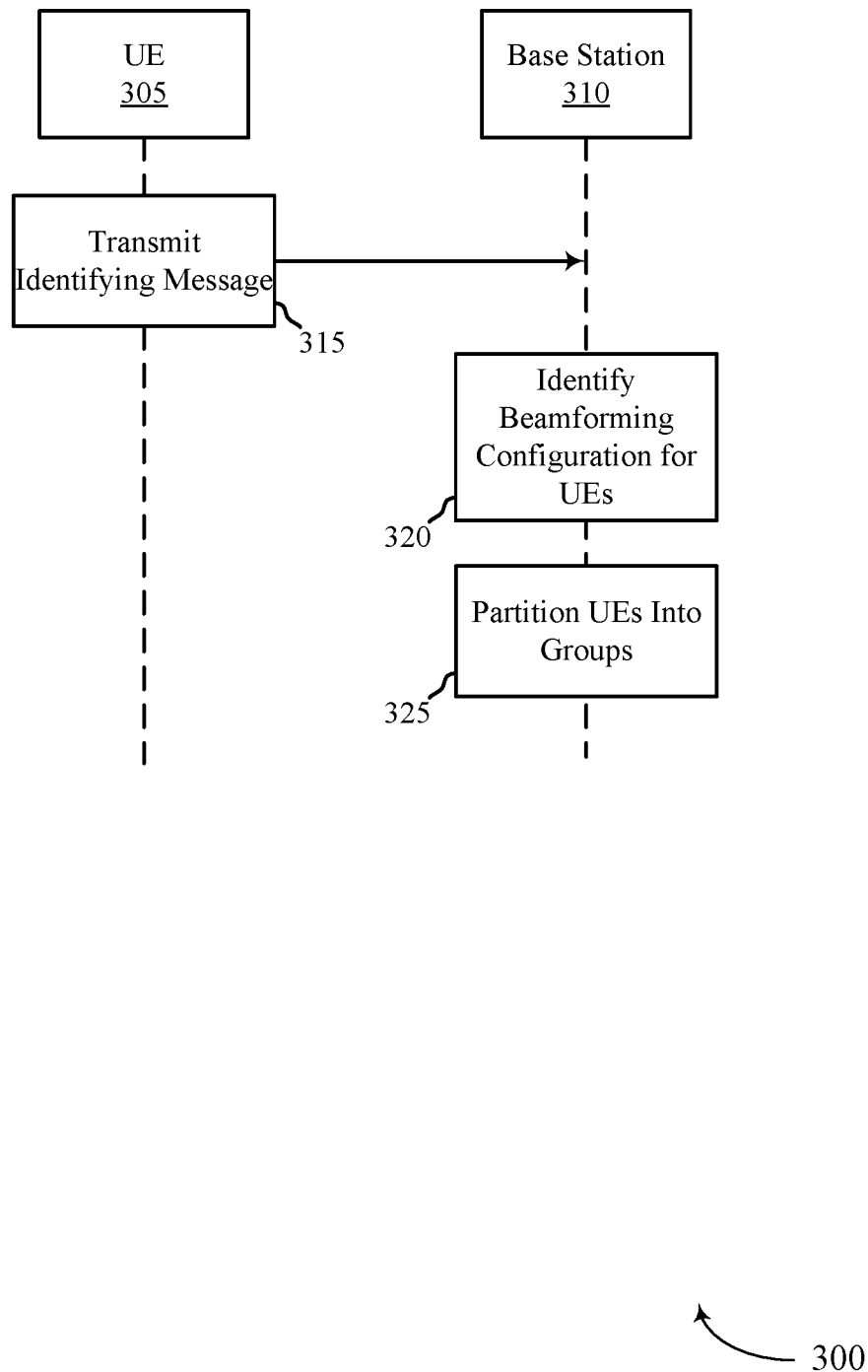
FIG. 3 illustrates an example of a process that supports methods to schedule multiple users for RS transmissions in mmW systems, in accordance with one or more aspects of the present disclosure.

FIG. 3 illustrates an example of a process 300 that supports methods to schedule multiple users for RS transmissions in mmW systems, in accordance with one or more aspects of the present disclosure. In some examples, process 300 may implement aspects of wireless communication system 100 and/or process 200. Process 300 may include a UE 305 and a base station 310, which may be examples of the corresponding devices described herein. Generally, process 300 illustrates one example of the base station 310 partitioning UEs (such as UE 305) into groups.

As discussed above, a channel between the base station 310 and the i-th UE may be denoted as $H_i$. During a beam training phase, base station 310 may use a transmit beamform codebook with training beams $F=\{f_{Tr,1}, \ldots, f_{Tr,N}\}$. During the beam training phase, UE 305 may run though its codebook (e.g., UE-specific codebook) using beams $G_i = \{g_{Tr,1}^{(i)}, \ldots, g_{Tr,M}^{(i)}\}$. UE 305 may transmit feedback messages to base station 310 carrying or otherwise conveying beam indices $j_1^{(i)}$ that satisfy:

$$(f_1^{(i)}, k_1) = \arg\max_{j=1,\ldots,N, k=1,\ldots,M} |(g_{Tr,k}^{(i)})^H H_i f_{Tr,j}|^2$$

Thus, the UE 305 may feed back the top-K beam information (e.g., a first set of transmit beams comprising the "best" transmit beams having the highest RSRP) along with the channel characteristic for each K beam (e.g., the RSRP value). Broadly, base station 310 may receive such feedback from multiple UEs and use it to partition the UEs into groups.

At 315, UE 305 may transmit (and base station 310 may receive) a message identifying a first set of transmit beams having a channel characteristic above a threshold and, for each beam in the first set of transmit beams, a channel characteristic value, e.g., the top-K transmit beams and their associated RSRP values. In some aspects, base station 310 may receive such messages from a plurality of UEs, e.g., some or all of the UEs associated with base station 310.

At 320, base station 310 may identify a beamforming configuration to use for communications with the UE. The beamforming configuration may be based, at least in some aspects, on the first set of transmit beams and their associated channel characteristic value. Base station 310 may identify the beamforming configuration for each UE transmitting a feedback message to base station 310.

In some aspects, the beamforming configuration may be associated with a beamforming codebook where, for each UE, base station 310 identifies one or more of an angle of departure in the azimuth (AoD) and/or an angle of departure in the zenith (ZoD). A mmW channel may provide a direction structure and the transmit codebook F may correspond to directional beams in AoD and/or ZoD. In some aspects, the beamforming configuration may identify a location of the UE (at least with respect to the top-K transmit beams of the UE and their associated RSRP values).

At 325, base station 310 may partition UEs into groups of UEs. The UEs may be selected for a particular group based on the beamforming configuration associated with each UE being within a threshold value. For example, the beamforming configuration may include an AoD that is within a set of AoD ranges and a ZoD that is within a set of ZoD ranges. In some aspects, base station 310 may select UEs from the groups of UEs based on the group that they are partitioned into. For example, each group of UEs may include UEs with different AoD/ZoD values and may exclude UEs with the same AoD/ZoD. In some aspects, the channel characteristic may be associated with the transmit power associated with the beamforming configuration such that base station 310 may select UEs for MU transmission dependent upon the amount of transmit power required by each UE (e.g., based on the best transmit beam and associated RSRP value for the UE).

Figure 4:
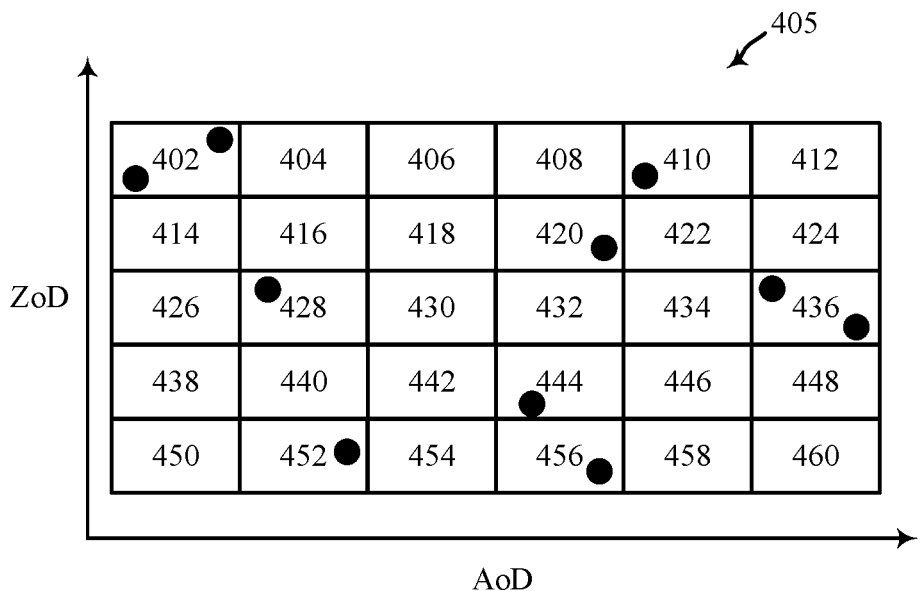
FIG. 4 illustrates an example of a partitioning scheme that supports methods to schedule multiple users for RS transmissions in mmW systems, in accordance with one or more aspects of the present disclosure.
Figure 4:
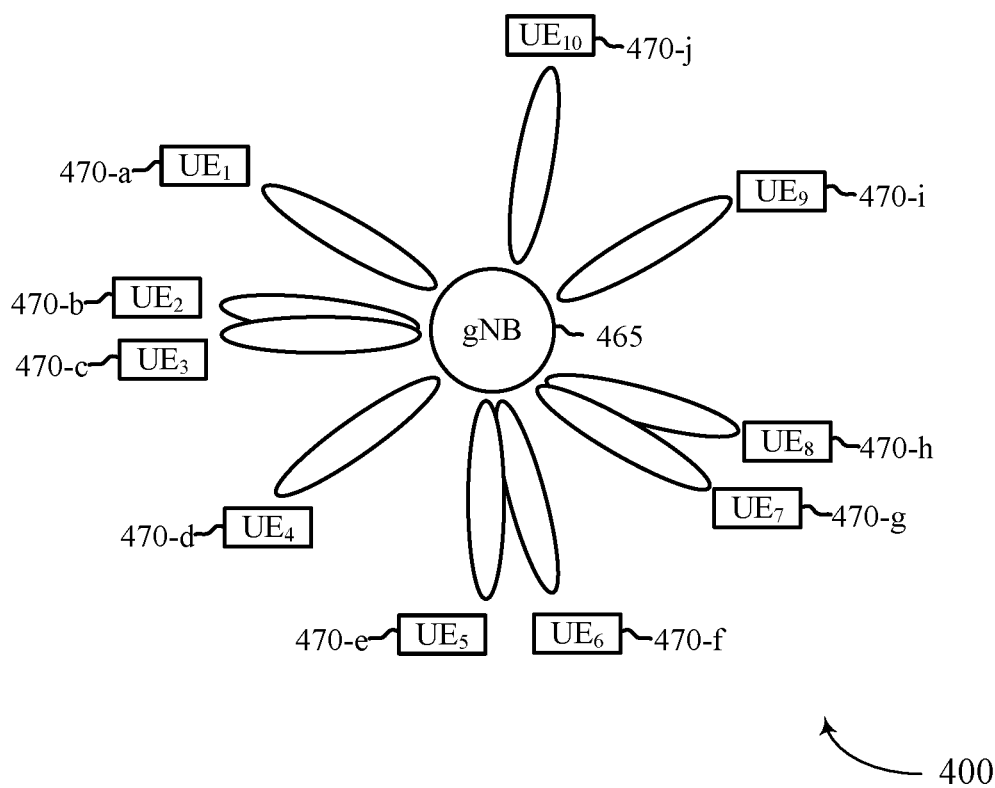

FIG. 4 illustrates an example of a partitioning scheme 400 that supports methods to schedule multiple users for RS transmissions in mmW systems, in accordance with one or more aspects of the present disclosure. In some examples, partitioning scheme 400 may implement aspects of wireless communication system 100 and/or processes 200/300. Partitioning scheme 400 may include a codebook 405, a base station 465 (e.g., gNB), and a plurality of UEs 470, which may be examples of the corresponding devices described herein.

Generally, codebook 405 may include a plurality of sections (labeled as 402, 404, 406, . . . , 460 for ease of reference). The codebook 405 may cover a particular range in the azimuth and zenith. For example, codebook 405 may cover a 90 degree section of coverage area (e.g., 0-90, 90-180, 180-270, or 270-360 degrees) in the azimuth direction and 30 degrees in the zenith (e.g., 0-30, 30-60, or 60-90 degrees). However, codebook 405 may cover 120, 150, etc. degrees in the azimuth and/or 45, 60, etc. degrees in the zenith. Thus, each section of the codebook 405 will be associated with a particular range of AoD and Zod. As one example where the codebook 405 covers 90 degrees in the azimuth and 30 degrees in the zenith, section 402 may cover 0-15 degrees in the azimuth and 24-30 degrees in the zenith. As another example, section 432 may cover 45-60 degrees in the azimuth and 12-18 degrees in the zenith. Thus, in the example where the codebook covers 90 degrees in the azimuth and 30 degrees in the zenith, each section may cover 15 degrees in the azimuth and 6 degrees in the zenith. Also, it is to be understood that codebook 405 may have other sizes (e.g., may include more or less than 30 sections).

In some aspects, base station 465 may place each UE 470 within its coverage area in the codebook dependent upon the beamforming configuration. For example, UE(s) 470 associated with a transmit beam having an AoD between 0-15 degrees and an ZoD between 24-30 degrees may be placed in the section 402 of the codebook 405. The UEs 470 illustrated in FIG. 4 are placed in the codebook 405 and illustrated as dots. Thus, in the example codebook 405 the ten UEs 470-a through 470-j are placed in the codebook 405 according to the corresponding beamforming configuration for each UE 470.

In some aspects, base station 465 may partition the UEs 470 into different groups based on their beamforming configurations. In one non-limiting example, each section may be considered a group of UEs. In another non-limiting example, base station 465 may partition sections 402, 404, 414, and 416 into a first group, sections 406, 408, 418, and 420 into a second group, and so on. In other examples, base station 465 may partition sections 402-406, 414-418, 426-430, 438-442, and 450-454 into a first group and sections 408-412, 420-424, 432-436, 444-448, and 456-460 into a second group. Broadly, base station 465 may break up the codebook 405 into various configurations (having an even number of sections per group and/or an uneven number of sections per group).

In some aspects, base station 465 may use $f_{Tr,j1}^{(i)}$ to partition the AoD/Zod space amongst all UEs 470 in the cell to form beam groups of UEs (k-th group may be denoted as $B_K$ where:

$$B_k = \{I : |AoD(\phi_{UE_i}) - AoD(\phi_{UE_j})| < \phi_{min} \text{ and } |ZoD(\theta_{UE_i}) - ZoD(\theta_{UE_j})| < \theta_{min} \text{ for all } i, j \in I\}$$

In some aspects, UEs 470 within a $B_K$ may mutually interfere with each other if scheduled for simultaneous transmissions. Thus, base station 465 may select K UEs 470, one from a distinct group $B_K$. K may be chosen based on base station 465 cost, complexity, energy constraints, number of radio frequency (RF) chains that are available, and the like.

In some aspects, the criterion used by base station 465 for selecting UEs 470 may be based on the RSRP, e.g., RSRPs of the selected UEs 470 may be comparable (to avoid power control measures at base station 465). In some aspects, the criterion may not be RSRP based such that the RSRPs of the selected UEs may not be comparable (and the base station 465 may perform power control steps). In some aspects, the sum-rate of the selected UEs 470 may be maximized in a fair manner (e.g., maintain and update fairness criterion).

Figure 5:
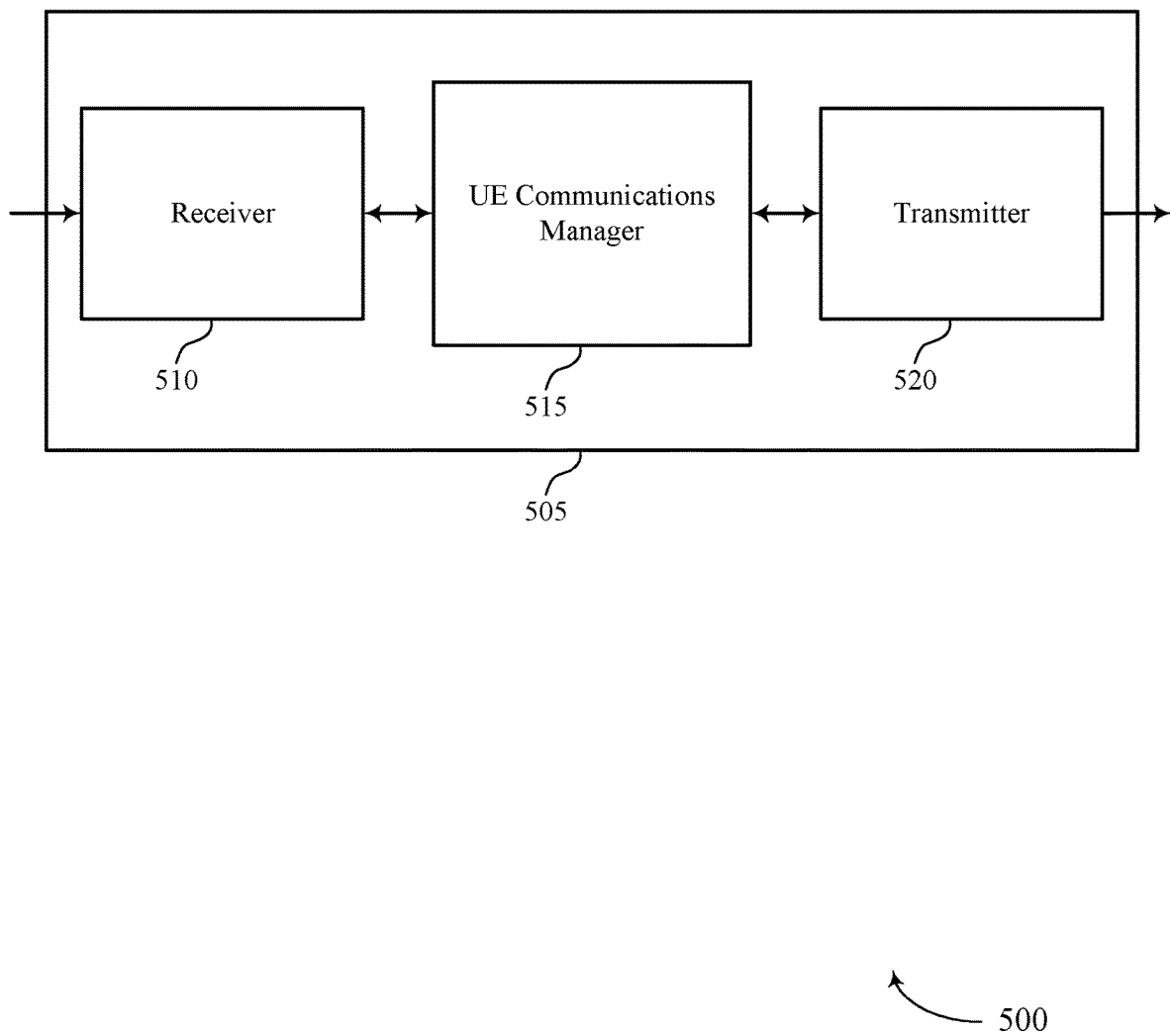
FIGS. 5 through 7 show block diagrams of a device that supports methods to schedule multiple users for RS transmissions in mmW systems, in accordance with one or more aspects of the present disclosure.

FIG. 5 shows a block diagram 500 of a wireless device 505 that supports methods to schedule multiple users for RS transmissions in mmW systems, in accordance with one or more aspects of the present disclosure. Wireless device 505 may be an example of aspects of a UE 115 as described herein. Wireless device 505 may include receiver 510, UE communications manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to methods to schedule multiple users for RS transmissions in mmW systems, etc.). Information may be passed on to other components of the device. The receiver 510 may be an example of aspects of the transceiver 835 described with reference to FIG. 8. The receiver 510 may utilize a single antenna or a set of antennas.

UE communications manager 515 may be an example of aspects of the UE communications manager 815 described with reference to FIG. 8.

UE communications manager 515 and/or at least some of its various sub-components may be implemented in hardware, software executed by a processor, firmware, or any combination thereof. If implemented in software executed by a processor, the functions of the UE communications manager 515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE communications manager 515 and/or at least some of its various sub-components may be physically located at various positions, including being distributed such that portions of functions are implemented at different physical locations by one or more physical devices. In some examples, UE communications manager 515 and/or at least some of its various sub-components may be a separate and distinct component in accordance with various aspects of the present disclosure. In other examples, UE communications manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 515 may identify a first set of transmit beams and an associated first set of receive beams having a channel characteristic that is below a first threshold. UE communications manager 515 may identify, for each receive beam in the first set of receive beams, a transmit beam in a second set of transmit beams having a channel characteristic above a second threshold. UE communications manager 515 may identify a relative channel characteristic value between each transmit beam in the first set of transmit beams and each transmit beam in the second set of transmit beams. UE communications manager 515 may transmit a message that identifies the beams in the first and second set of transmit beams, the identified receive beam from the first set of receive beams for each beam in the first set of transmit beams, and the relative channel characteristic value.

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8. The transmitter 520 may utilize a single antenna or a set of antennas.

Figure 6:
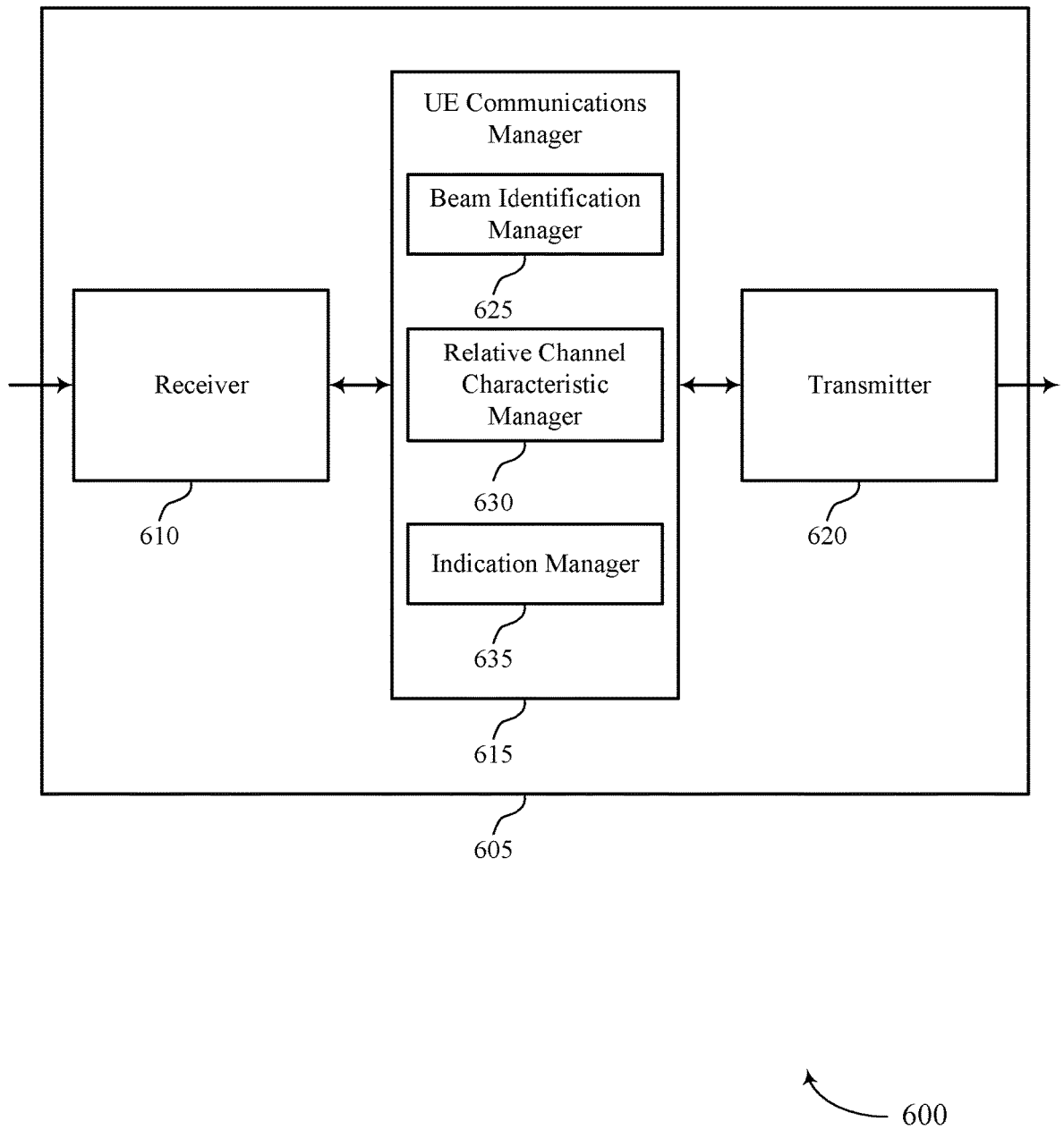

FIG. 6 shows a block diagram 600 of a wireless device 605 that supports methods to schedule multiple users for RS transmissions in mmW systems, in accordance with one or more aspects of the present disclosure. Wireless device 605 may be an example of aspects of a wireless device 505 or a UE 115 as described herein. Wireless device 605 may include receiver 610, UE communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to methods to schedule multiple users for RS transmissions in mmW systems, etc.). Information may be passed on to other components of the device. The receiver 610 may be an example of aspects of the transceiver 835 described with reference to FIG. 8. The receiver 610 may utilize a single antenna or a set of antennas.

UE communications manager 615 may be an example of aspects of the UE communications manager 815 described with reference to FIG. 8. UE communications manager 615 may also include beam identification manager 625, relative channel characteristic manager 630, and indication manager 635.

Beam identification manager 625 may identify a first set of transmit beams and an associated first set of receive beams having a channel characteristic that is below a first threshold and identify, for each receive beam in the first set of receive beams, a transmit beam in a second set of transmit beams having a channel characteristic above a second threshold. In some cases, the channel characteristic includes one or more of a RSRP, a RSRQ, a SNR, a SINR, and CQI.

Relative channel characteristic manager 630 may identify a relative channel characteristic value between each transmit beam in the first set of transmit beams and each transmit beam in the second set of transmit beams.

Indication manager 635 may transmit a message that identifies the beams in the first and second set of transmit beams, the identified receive beam from the first set of receive beams for each beam in the first set of transmit beams, and the relative channel characteristic value.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may utilize a single antenna or a set of antennas.

Figure 7:
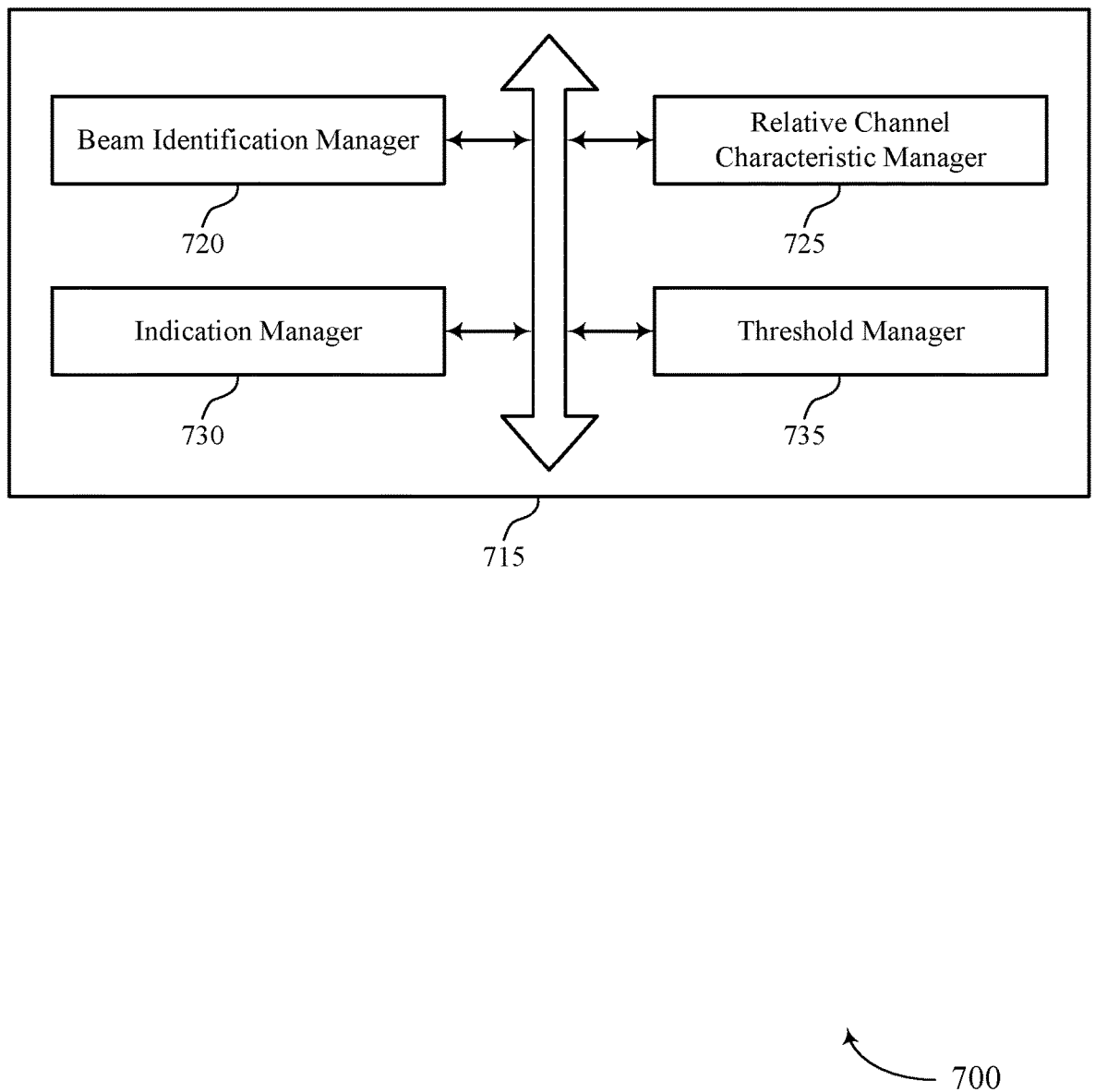

FIG. 7 shows a block diagram 700 of a UE communications manager 715 that supports methods to schedule multiple users for RS transmissions in mmW systems, in accordance with one or more aspects of the present disclosure. The UE communications manager 715 may be an example of aspects of a UE communications manager 515, a UE communications manager 615, or a UE communications manager 815 described with reference to FIGS. 5, 6, and 8. The UE communications manager 715 may include beam identification manager 720, relative channel characteristic manager 725, indication manager 730, and threshold manager 735. Each of these modules may communicate, directly or indirectly, with one another (e.g., via one or more buses).

Beam identification manager 720 may identify a first set of transmit beams and an associated first set of receive beams having a channel characteristic that is below a first threshold. Beam identification manager 720 may identify, for each receive beam in the first set of receive beams, a transmit beam in a second set of transmit beams having a channel characteristic above a second threshold. In some cases, the channel characteristic includes one or more of a RSRP, a RSRQ, a SNR, a SINR, and a CQI.

Relative channel characteristic manager 725 may identify a relative channel characteristic value between each transmit beam in the first set of transmit beams and each transmit beam in the second set of transmit beams.

Indication manager 730 may transmit a message that identifies the beams in the first and second set of transmit beams, the identified receive beam from the first set of receive beams for each beam in the first set of transmit beams, and the relative channel characteristic value.

Threshold manager 735 may identify a third set of transmit beams having a channel characteristic that is above the first threshold and below a third threshold, the third threshold being lower than the second threshold. Threshold manager 735 may identify the relative channel characteristic value from a beam in the third set of transmit beams and each beam in the second set of transmit beams. Threshold manager 735 may identify a threshold value associated with the relative channel characteristic value. Threshold manager 735 may identify the relative channel characteristic based on the threshold value. Threshold manager 735 may transmit the message that further identifies the beams in the third set of transmit beams and, for each beam, an associated channel characteristic.

Figure 8:
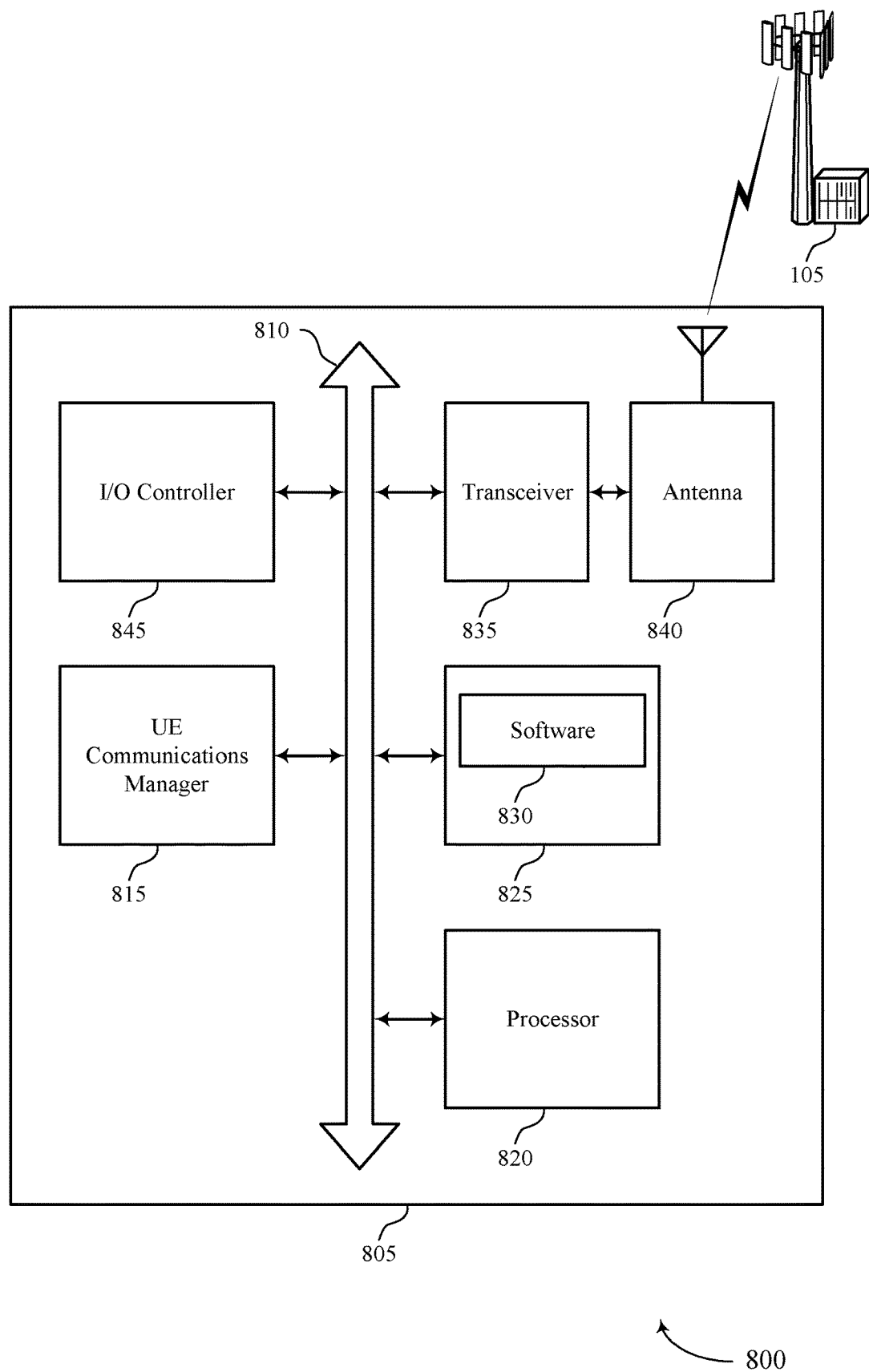
FIG. 8 illustrates a block diagram of a system including a UE that supports methods to schedule multiple users for RS transmissions in mmW systems, in accordance with one or more aspects of the present disclosure.

FIG. 8 shows a diagram of a system 800 including a device 805 that supports methods to schedule multiple users for RS transmissions in mmW systems, in accordance with one or more aspects of the present disclosure. Device 805 may be an example of or include the components of wireless device 505, wireless device 605, or a UE 115 as described herein. Device 805 may include components for bi-directional voice and data communications including components for transmitting and receiving communications, including UE communications manager 815, processor 820, memory 825, software 830, transceiver 835, antenna 840, and I/O controller 845. These components may be in electronic communication via one or more buses (e.g., bus 810). Device 805 may communicate wirelessly with one or more base stations 105.

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting methods to schedule multiple users for RS transmissions in mmW systems).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware or software operation such as the interaction with peripheral components or devices.

Software 830 may include code to implement aspects of the present disclosure, including code to support methods to schedule multiple users for RS transmissions in mmW systems. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas.

In some cases, the wireless device may include a single antenna 840. However, in some cases the device may have more than one antenna 840, which may be capable of concurrently transmitting or receiving multiple wireless transmissions.

I/O controller 845 may manage input and output signals for device 805. I/O controller 845 may also manage peripherals not integrated into device 805. In some cases, I/O controller 845 may represent a physical connection or port to an external peripheral. In some cases, I/O controller 845 may utilize an operating system such as iOS®, ANDROID®, MS-DOS®, MS-WINDOWS®, OS/2®, UNIX®, LINUX®, or another known operating system. In other cases, I/O controller 845 may represent or interact with a modem, a keyboard, a mouse, a touchscreen, or a similar device. In some cases, I/O controller 845 may be implemented as part of a processor. In some cases, a user may interact with device 805 via I/O controller 845 or via hardware components controlled by I/O controller 845.

Figure 9:
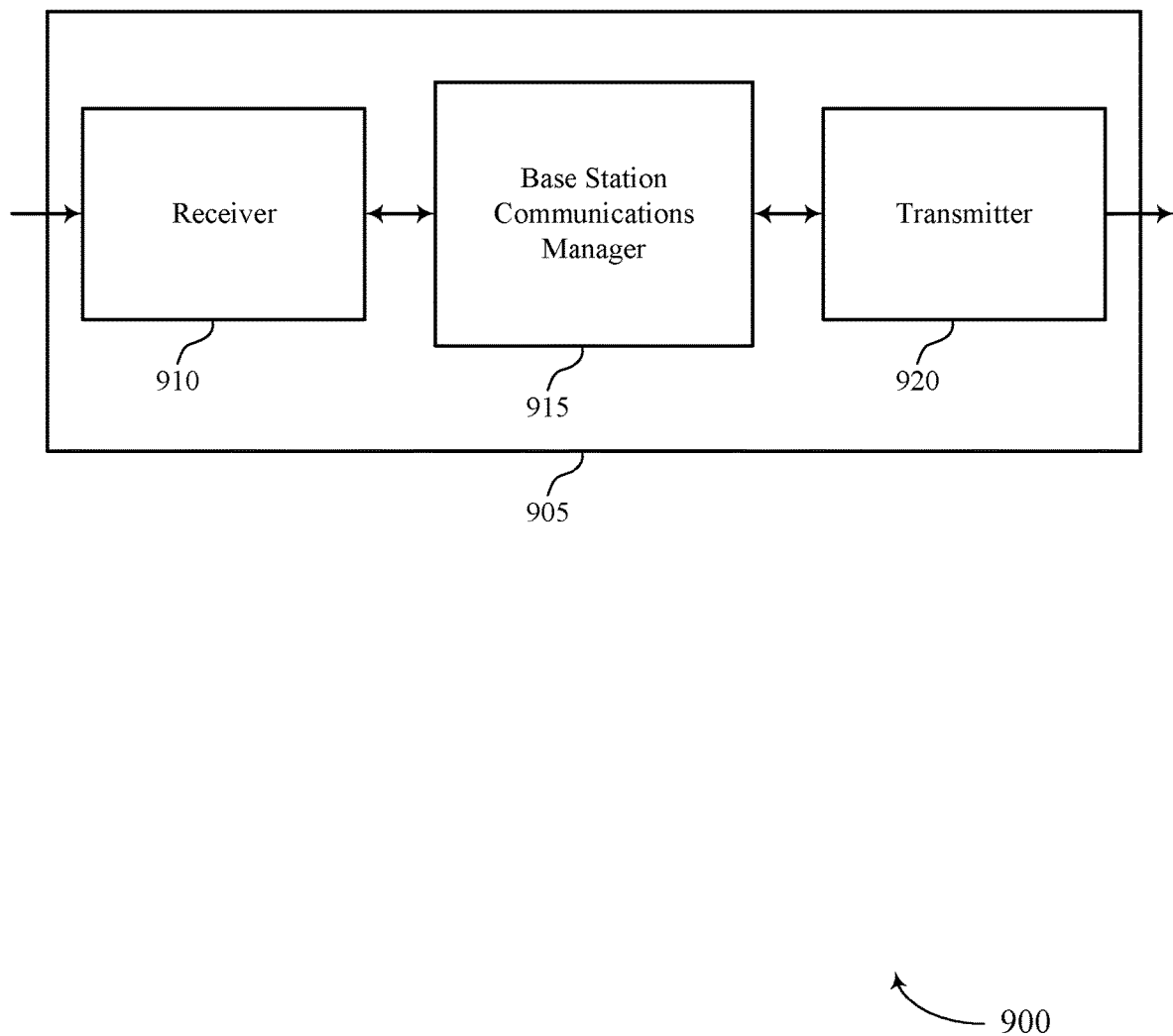
FIGS. 9 through 11 show block diagrams of a device that supports methods to schedule multiple users for RS transmissions in mmW systems, in accordance with one or more aspects of the present disclosure.

FIG. 9 shows a block diagram 900 of a wireless device 905 that supports methods to schedule multiple users for RS transmissions in mmW systems, in accordance with one or more aspects of the present disclosure. Wireless device 905 may be an example of aspects of a base station 105 as described herein. Wireless device 905 may include receiver 910, base station communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to methods to schedule multiple users for RS transmissions in mmW systems, etc.). Information may be passed on to other components of the device. The receiver 910 may be an example of aspects of the transceiver 1235 described with reference to FIG. 12. The receiver 910 may utilize a single antenna or a set of antennas.

Base station communications manager 915 may be an example of aspects of the base station communications manager 1215 described with reference to FIG. 12.

Base station communications manager 915 and/or at least some of its various sub-components may be implemented in hardware, software executed by a processor, firmware, or any combination thereof. If implemented in software executed by a processor, the functions of the base station communications manager 915 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station communications manager 915 and/or at least some of its various sub-components may be physically located at various positions, including being distributed such that portions of functions are implemented at different physical locations by one or more physical devices. In some examples, base station communications manager 915 and/or at least some of its various sub-components may be a separate and distinct component in accordance with various aspects of the present disclosure. In other examples, base station communications manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

In some aspects, base station communications manager 915 may receive a message from a set of UEs, each message identifying beams in a first set of transmit beams having a channel characteristic that is below a first threshold and an associated first set of receive beams, a second set of transmit beams for each receive beam in the first set of receive beams that have a channel characteristic that is above a second threshold, and a relative channel characteristic value between each beam in the first and second sets of transmit beams. Base station communications manager 915 may construct, for each of the set of UEs, a beam pairing table including the first and second sets of transmit beams, the associated receive beam for each beam in the set of transmit beams, and the relative channel characteristic value. Base station communications manager 915 may select, based on the beam pairing table, a set of UEs for multi-user transmissions.

In some aspects, the base station communications manager 915 may receive, from each UE of a set of UEs, a message identifying a first set of transmit beams having a channel characteristic above a threshold and, for each beam in the first set of transmit beams, a channel characteristic value. Base station communications manager 915 may identify, for each UE and based on the first set of transmit beams and channel characteristic value, a beamforming configuration to use for communications with the UE. Base station communications manager 915 may partition the set of UEs into one or more groups of UEs, where UEs are selected for a group based on the beamforming configuration associated with each UE being within a threshold value.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may utilize a single antenna or a set of antennas.

Figure 10:
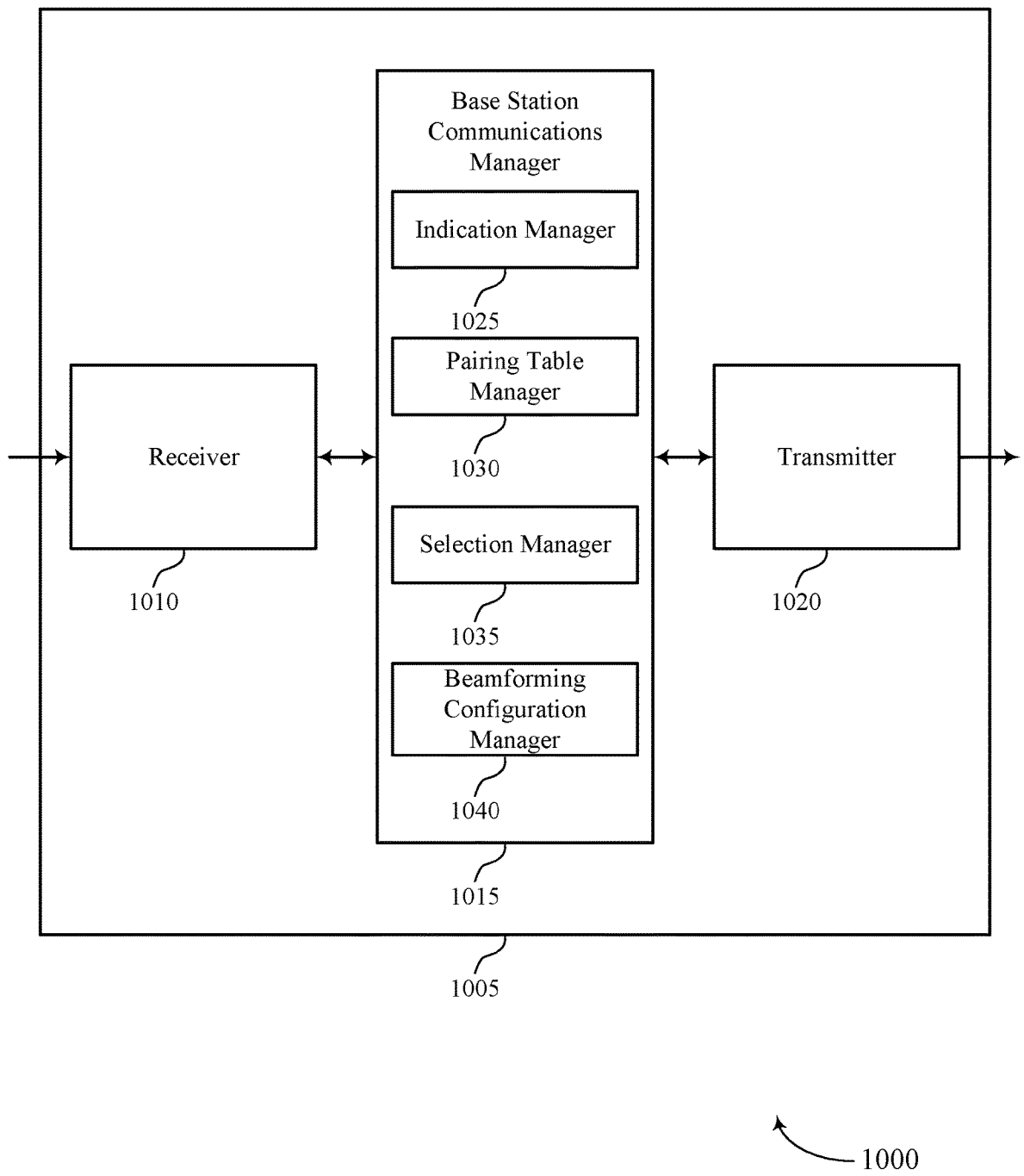

FIG. 10 shows a block diagram 1000 of a wireless device 1005 that supports methods to schedule multiple users for RS transmissions in mmW systems, in accordance with one or more aspects of the present disclosure. Wireless device 1005 may be an example of aspects of a wireless device 905 or a base station 105 as described herein. Wireless device 1005 may include receiver 1010, base station communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to methods to schedule multiple users for RS transmissions in mmW systems, etc.). Information may be passed on to other components of the device. The receiver 1010 may be an example of aspects of the transceiver 1235 described with reference to FIG. 12. The receiver 1010 may utilize a single antenna or a set of antennas.

Base station communications manager 1015 may be an example of aspects of the base station communications manager 1215 described with reference to FIG. 12.

Base station communications manager 1015 may also include indication manager 1025, pairing table manager 1030, selection manager 1035, and beamforming configuration manager 1040.

Indication manager 1025 may receive a message from a set of UEs, each message identifying beams in a first set of transmit beams having a channel characteristic that is below a first threshold and an associated first set of receive beams, a second set of transmit beams for each receive beam in the first set of receive beams that have a channel characteristic that is above a second threshold, and a relative channel characteristic value between each beam in the first and second sets of transmit beams. Indication manager 1025 may receive, from each UE of a set of UEs, a message identifying a first set of transmit beams having a channel characteristic above a threshold and, for each beam in the first set of transmit beams, a channel characteristic value.

Pairing table manager 1030 may construct, for each of the set of UEs, a beam pairing table including the first and second sets of transmit beams, the associated receive beam for each beam in the set of transmit beams, and the relative channel characteristic value.

Selection manager 1035 may select, based on the beam pairing table, a set of UEs for multi-user transmissions. Selection manager 1035 may partition the set of UEs into one or more groups of UEs, where UEs are selected for a group based on the beamforming configuration associated with each UE being within a threshold value. Selection manager 1035 may select, based on the beamforming configuration of each UE, a UE from each group of UEs for simultaneous transmissions. Selection manager 1035 may refrain, based on the beamforming configuration of each UE, from selecting UEs from within a group of UEs for simultaneous transmissions. Selection manager 1035 may select, for each UE and based on the channel characteristic value, a UE from each group of UEs for simultaneous transmissions. In some cases, the channel characteristic includes one or more of a RSRP, a RSRQ, a SNR, a SINR, and a CQI. In some cases, the channel characteristic includes a transmit power associated with the beamforming configuration.

Beamforming configuration manager 1040 may identify, for each UE and based on the first set of transmit beams and channel characteristic value, a beamforming configuration to use for communications with the UE.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may utilize a single antenna or a set of antennas.

Figure 11:
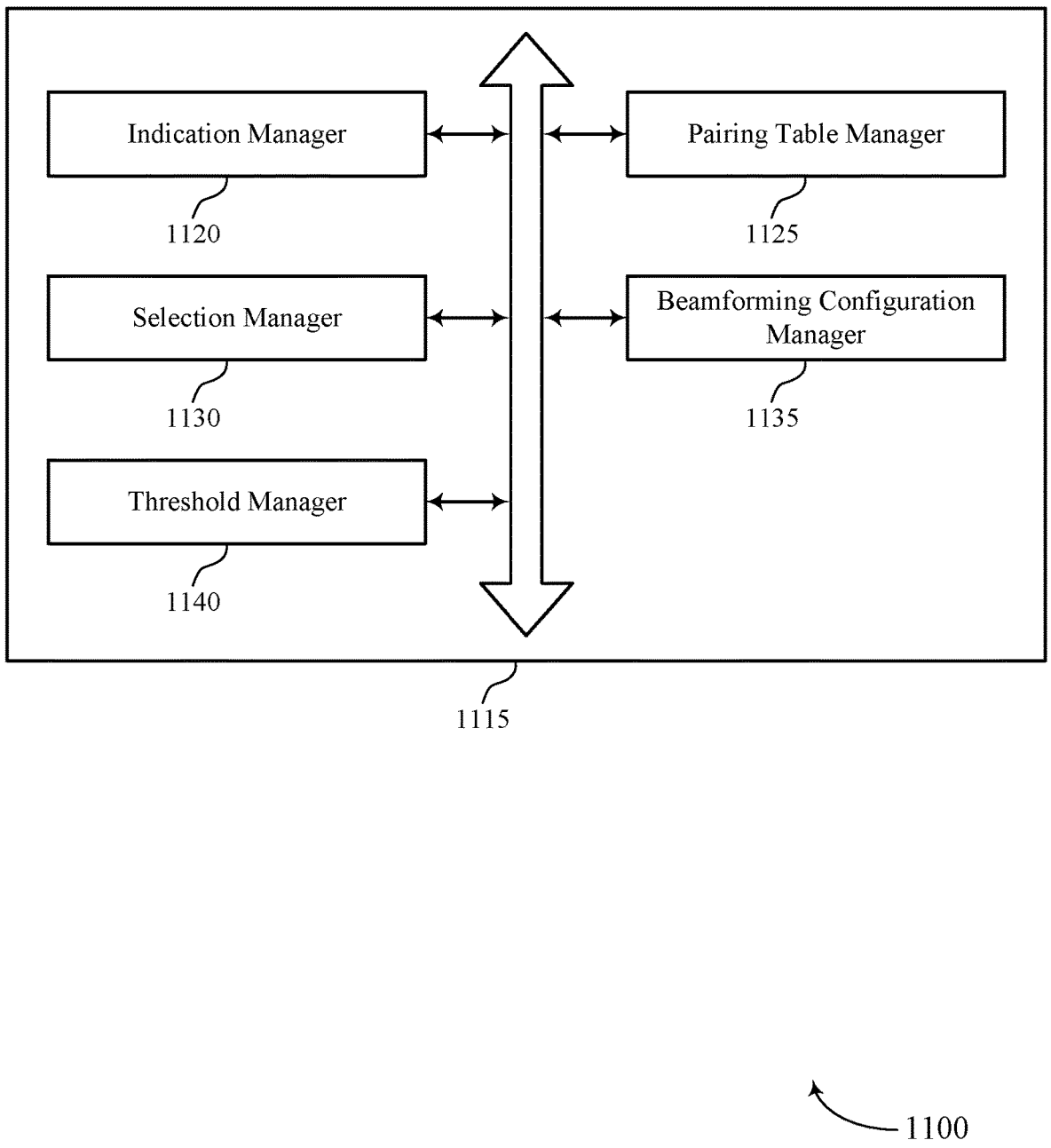

FIG. 11 shows a block diagram 1100 of a base station communications manager 1115 that supports methods to schedule multiple users for RS transmissions in mmW systems, in accordance with one or more aspects of the present disclosure. The base station communications manager 1115 may be an example of aspects of a base station communications manager 1215 described with reference to FIGS. 9, 10, and 12. The base station communications manager 1115 may include indication manager 1120, pairing table manager 1125, selection manager 1130, beamforming configuration manager 1135, and threshold manager 1140. Each of these modules may communicate, directly or indirectly, with one another (e.g., via one or more buses).

Indication manager 1120 may receive a message from a set of UEs, each message identifying beams in a first set of transmit beams having a channel characteristic that is below a first threshold and an associated first set of receive beams, a second set of transmit beams for each receive beam in the first set of receive beams that have a channel characteristic that is above a second threshold, and a relative channel characteristic value between each beam in the first and second sets of transmit beams. Indication manager 1120 may receive, from each UE of a set of UEs, a message identifying a first set of transmit beams having a channel characteristic above a threshold and, for each beam in the first set of transmit beams, a channel characteristic value.

Pairing table manager 1125 may construct, for each of the set of UEs, a beam pairing table including the first and second sets of transmit beams, the associated receive beam for each beam in the set of transmit beams, and the relative channel characteristic value.

Selection manager 1130 may select, based on the beam pairing table, a set of UEs for multi-user transmissions. Selection manager 1130 may partition the set of UEs into one or more groups of UEs, where UEs are selected for a group based on the beamforming configuration associated with each UE being within a threshold value. Selection manager 1130 may select, based on the beamforming configuration of each UE, a UE from each group of UEs for simultaneous transmissions. Selection manager 1130 may refrain, based on the beamforming configuration of each UE, from selecting UEs from within a group of UEs for simultaneous transmissions. Selection manager 1130 may select, for each UE and based on the channel characteristic value, a UE from each group of UEs for simultaneous transmissions. In some cases, the channel characteristic includes one or more of a RSRP, a RSRQ, a SNR, a SINR, and a CQI. In some cases, the channel characteristic includes a transmit power associated with the beamforming configuration.

Beamforming configuration manager 1135 may identify, for each UE and based on the first set of transmit beams and channel characteristic value, a beamforming configuration to use for communications with the UE.

Threshold manager 1140 may receive the message that further identifies a third set of transmit beams having a channel characteristic above the first threshold and below a third threshold and, for each beam, an associated channel characteristic, the third threshold being lower than the second threshold, where the beam pairing table is constructed based on the third set of transmit beams. Threshold manager 1140 may identify a threshold value associated with the relative channel characteristic value, where the beam pairing table is constructed based on the threshold value. Threshold manager 1140 may identify UEs from the beam pairing table having a channel characteristic within a predefined threshold value, where the UEs are selected in the set of UEs. In some cases, the channel characteristic includes one or more of a RSRP, a RSRQ, a SNR, a SINR, and a CQI.

Figure 12:
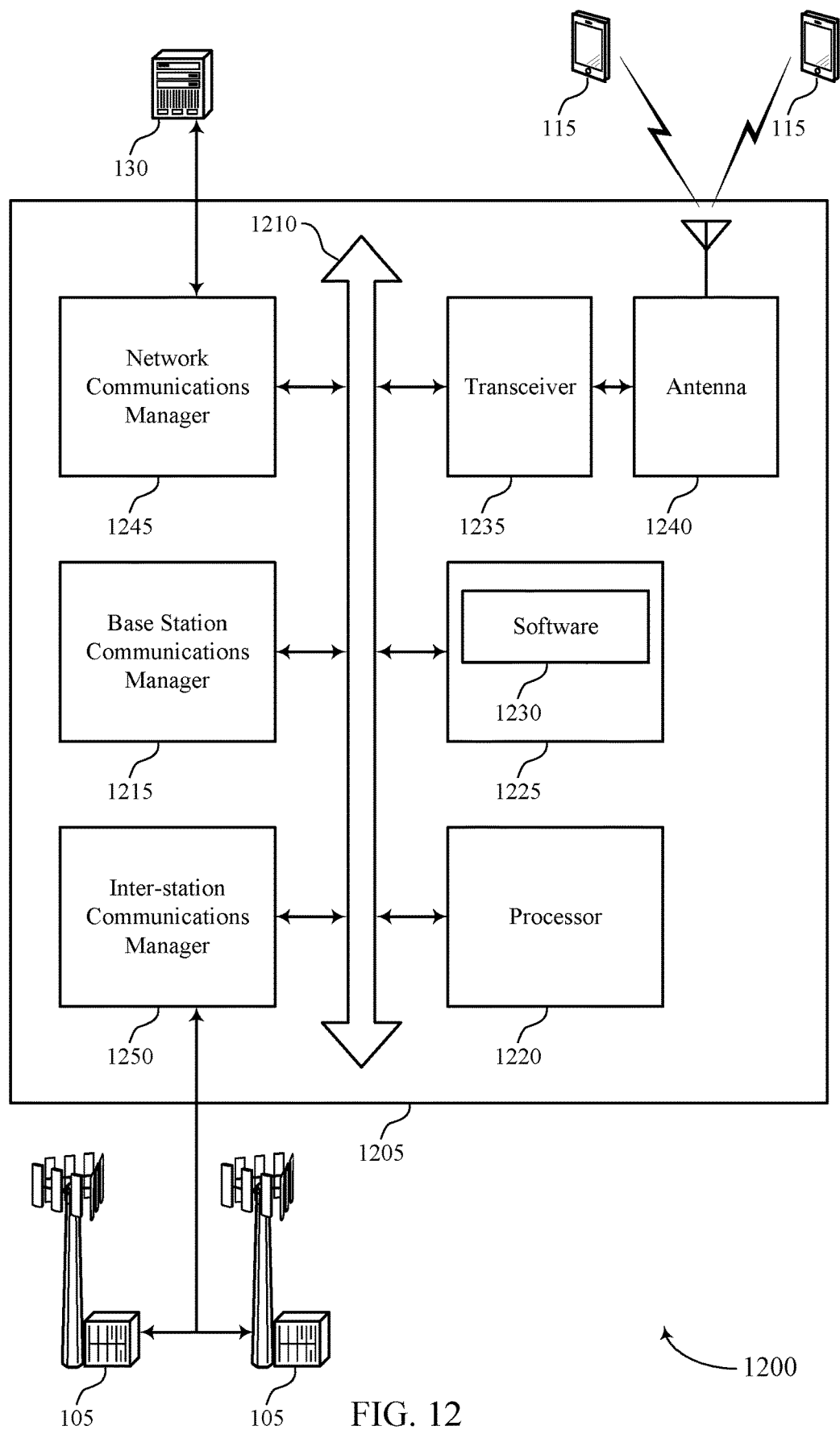
FIG. 12 illustrates a block diagram of a system including a base station that supports methods to schedule multiple users for RS transmissions in mmW systems, in accordance with one or more aspects of the present disclosure.

FIG. 12 shows a diagram of a system 1200 including a device 1205 that supports methods to schedule multiple users for RS transmissions in mmW systems, in accordance with one or more aspects of the present disclosure. Device 1205 may be an example of or include the components of base station 105 as described herein. Device 1205 may include components for bi-directional voice and data communications including components for transmitting and receiving communications, including base station communications manager 1215, processor 1220, memory 1225, software 1230, transceiver 1235, antenna 1240, network communications manager 1245, and inter-station communications manager 1250. These components may be in electronic communication via one or more buses (e.g., bus 1210). Device 1205 may communicate wirelessly with one or more UEs 115.

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting methods to schedule multiple users for RS transmissions in mmW systems).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware or software operation such as the interaction with peripheral components or devices.

Software 1230 may include code to implement aspects of the present disclosure, including code to support methods to schedule multiple users for RS transmissions in mmW systems. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions.

Network communications manager 1245 may manage communications with the core network (e.g., via one or more wired backhaul links). For example, the network communications manager 1245 may manage the transfer of data communications for client devices, such as one or more UEs 115.

Inter-station communications manager 1250 may manage communications with other base station 105, and may include a controller or scheduler for controlling communications with UEs 115 in cooperation with other base stations 105. For example, the inter-station communications manager 1250 may coordinate scheduling for transmissions to UEs 115 for various interference mitigation techniques such as beamforming or joint transmission. In some examples, inter-station communications manager 1250 may provide an X2 interface within an LTE/LTE-A wireless communication network technology to provide communication between base stations 105.

Figure 13:
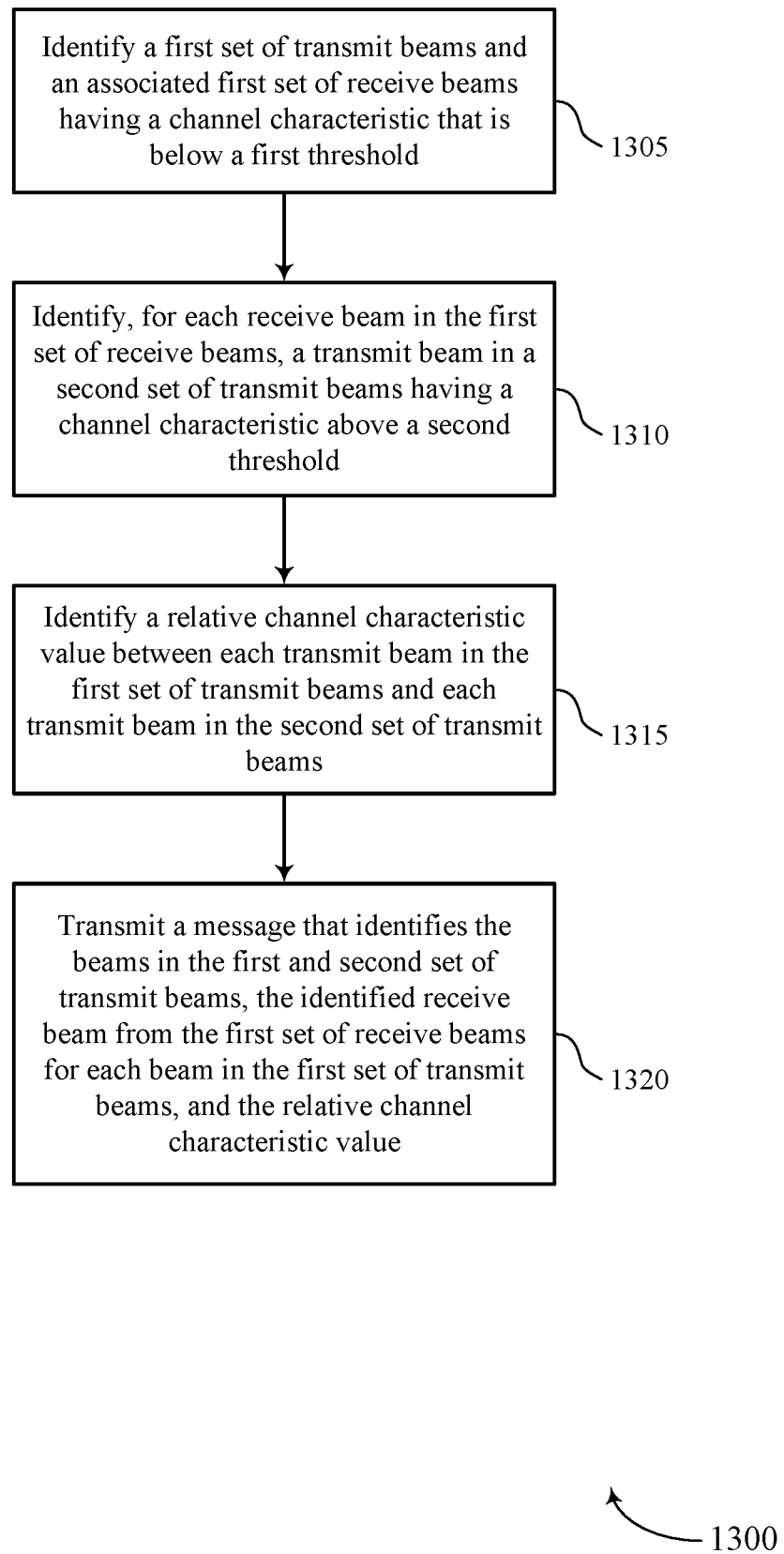
FIGS. 13 through 15 illustrate methods for methods to schedule multiple users for RS transmissions in mmW systems, in accordance with one or more aspects of the present disclosure.

FIG. 13 shows a flowchart illustrating a method 1300 for methods to schedule multiple users for RS transmissions in mmW systems, in accordance with one or more aspects of the present disclosure. The operations of method 1300 may be implemented by a UE 115 or its components as described herein. For example, the operations of method 1300 may be performed by a UE communications manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At block 1305 the UE 115 may identify a first set of transmit beams and an associated first set of receive beams having a channel characteristic that is below a first threshold. The operations of block 1305 may be performed according to the methods described herein. In certain examples, aspects of the operations of block 1305 may be performed by a beam identification manager as described with reference to FIGS. 5 through 8.

At block 1310 the UE 115 may identify, for each receive beam in the first set of receive beams, a transmit beam in a second set of transmit beams having a channel characteristic above a second threshold. The operations of block 1310 may be performed according to the methods described herein. In certain examples, aspects of the operations of block 1310 may be performed by a beam identification manager as described with reference to FIGS. 5 through 8.

At block 1315 the UE 115 may identify a relative channel characteristic value between each transmit beam in the first set of transmit beams and each transmit beam in the second set of transmit beams. The operations of block 1315 may be performed according to the methods described herein. In certain examples, aspects of the operations of block 1315 may be performed by a relative channel characteristic manager as described with reference to FIGS. 5 through 8.

At block 1320 the UE 115 may transmit a message that identifies the beams in the first and second set of transmit beams, the identified receive beam from the first set of receive beams for each beam in the first set of transmit beams, and the relative channel characteristic value. The operations of block 1320 may be performed according to the methods described herein. In certain examples, aspects of the operations of block 1320 may be performed by a indication manager as described with reference to FIGS. 5 through 8.

Figure 14:
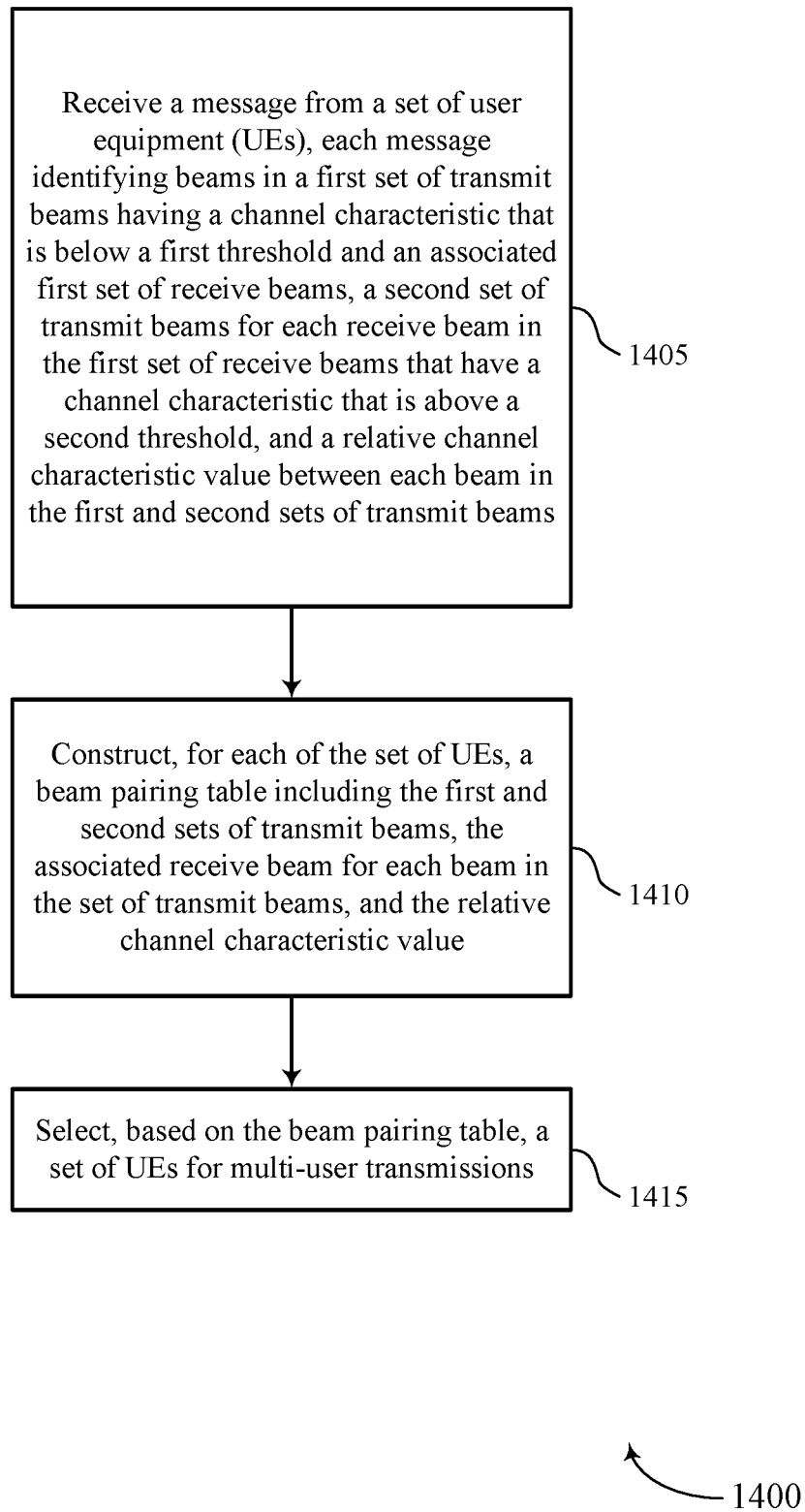

FIG. 14 shows a flowchart illustrating a method 1400 for methods to schedule multiple users for RS transmissions in mmW systems, in accordance with one or more aspects of the present disclosure. The operations of method 1400 may be implemented by a base station 105 or its components as described herein. For example, the operations of method 1400 may be performed by a base station communications manager as described with reference to FIGS. 9 through 12. In some examples, a base station 105 may execute a set of codes to control the functional elements of the device to perform the functions described below. Additionally or alternatively, the base station 105 may perform aspects of the functions described below using special-purpose hardware.

At block 1405 the base station 105 may receive a message from a plurality of UEs, each message identifying beams in a first set of transmit beams having a channel characteristic that is below a first threshold and an associated first set of receive beams, a second set of transmit beams for each receive beam in the first set of receive beams that have a channel characteristic that is above a second threshold, and a relative channel characteristic value between each beam in the first and second sets of transmit beams. The operations of block 1405 may be performed according to the methods described herein. In certain examples, aspects of the operations of block 1405 may be performed by a indication manager as described with reference to FIGS. 9 through 12.

At block 1410 the base station 105 may construct, for each of the plurality of UEs, a beam pairing table comprising the first and second sets of transmit beams, the associated receive beam for each beam in the set of transmit beams, and the relative channel characteristic value. The operations of block 1410 may be performed according to the methods described herein. In certain examples, aspects of the operations of block 1410 may be performed by a pairing table manager as described with reference to FIGS. 9 through 12.

At block 1415 the base station 105 may select, based at least in part on the beam pairing table, a set of UEs for multi-user transmissions. The operations of block 1415 may be performed according to the methods described herein. In certain examples, aspects of the operations of block 1415 may be performed by a selection manager as described with reference to FIGS. 9 through 12.

Figure 15:
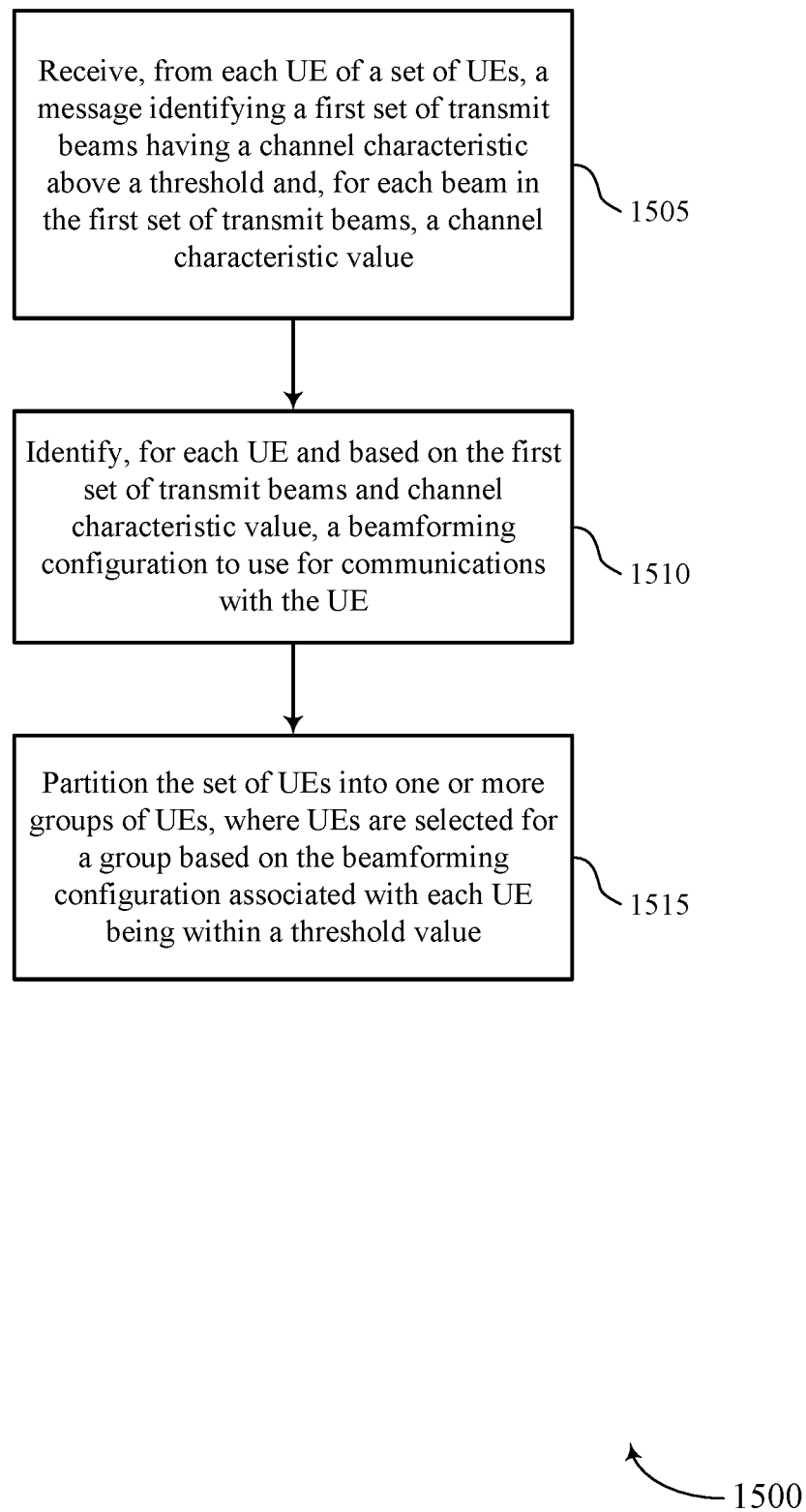

FIG. 15 shows a flowchart illustrating a method 1500 for methods to schedule multiple users for RS transmissions in mmW systems, in accordance with one or more aspects of the present disclosure. The operations of method 1500 may be implemented by a base station 105 or its components as described herein. For example, the operations of method 1500 may be performed by a base station communications manager as described with reference to FIGS. 9 through 12. In some examples, a base station 105 may execute a set of codes to control the functional elements of the device to perform the functions described below. Additionally or alternatively, the base station 105 may perform aspects of the functions described below using special-purpose hardware.

At block 1505 the base station 105 may receive, from each UE of a plurality of UEs, a message identifying a first set of transmit beams having a channel characteristic above a threshold and, for each beam in the first set of transmit beams, a channel characteristic value. The operations of block 1505 may be performed according to the methods described herein. In certain examples, aspects of the operations of block 1505 may be performed by a indication manager as described with reference to FIGS. 9 through 12.

At block 1510 the base station 105 may identify, for each UE and based at least in part on the first set of transmit beams and channel characteristic value, a beamforming configuration to use for communications with the UE. The operations of block 1510 may be performed according to the methods described herein. In certain examples, aspects of the operations of block 1510 may be performed by a beamforming configuration manager as described with reference to FIGS. 9 through 12.

At block 1515 the base station 105 may partition the plurality of UEs into one or more groups of UEs, wherein UEs are selected for a group based on the beamforming configuration associated with each UE being within a threshold value. The operations of block 1515 may be performed according to the methods described herein. In certain examples, aspects of the operations of block 1515 may be performed by a selection manager as described with reference to FIGS. 9 through 12.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communication systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communication system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communication system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communication system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communication system 100 of FIG. 1—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
    identifying a first set of transmit beams and an associated first set of receive beams having a value of a channel characteristic that is below a first threshold;

identifying, for each receive beam in the first set of receive beams, a transmit beam in a second set of transmit beams having a value of the channel characteristic above a second threshold;
identifying a relative channel characteristic value between each transmit beam in the first set of transmit beams and each transmit beam in the second set of transmit beams; and
transmitting a message that identifies the beams in the first and second sets of transmit beams, the identified receive beam from the first set of receive beams for each beam in the first set of transmit beams, and the relative channel characteristic values.

2. The method of claim 1, further comprising:
identifying a third set of transmit beams having a value of the channel characteristic that is above the first threshold and below a third threshold, the third threshold being lower than the second threshold; and
identifying the relative channel characteristic value from a beam in the third set of transmit beams and each beam in the second set of transmit beams.

3. The method of claim 2, further comprising:
identifying a threshold value associated with the relative channel characteristic value; and
wherein identifying the relative channel characteristic is based at least in part on the threshold value.

4. The method of claim 2, further comprising:
transmitting the message that further identifies the beams in the third set of transmit beams and, for each beam, an associated value of the channel characteristic.

5. The method of claim 1, wherein the channel characteristic comprises one or more of a received signal reference power (RSRP), a received signal reference quality (RSRQ), a signal-to-noise ratio (SNR), a signal-to-interference-and-noise ratio (SINR), and a channel quality indicator (CQI).

6. The method of claim 1, wherein the first threshold is set as a margin below the channel characteristic value of a best pair of the transmit and receive beams.

7. A method for wireless communication, comprising:
receiving a message from a plurality of user equipment (UEs), each message identifying beams in a first set of transmit beams having a value of a channel characteristic that is below a first threshold and an associated first set of receive beams, a second set of transmit beams for each receive beam in the first set of receive beams that have a value of the channel characteristic that is above a second threshold, and a relative channel characteristic value between each beam in the first and second sets of transmit beams;
constructing, for each of the plurality of UEs, a beam pairing table comprising the first and second sets of transmit beams, the associated receive beam for each beam in the set of transmit beams, and the relative channel characteristic values; and
selecting, based at least in part on the beam pairing table, a set of UEs for multi-user transmissions.

8. The method of claim 7, further comprising:
receiving the message that further identifies a third set of transmit beams having a value of the channel characteristic above the first threshold and below a third threshold and, for each beam, an associated channel characteristic value, the third threshold being lower than the second threshold, wherein the beam pairing table is constructed based at least in part on the third set of transmit beams.

9. The method of claim 7, further comprising:
identifying a threshold value associated with the relative channel characteristic value, wherein the beam pairing table is constructed based at least in part on the threshold value.

10. The method of claim 7, further comprising:
identifying UEs from the beam pairing table having a value of the channel characteristic within a predefined threshold value, wherein the UEs are selected in the set of UEs.

11. The method of claim 10, wherein the channel characteristic comprises one or more of a received signal reference power (RSRP), a received signal reference quality (RSRQ), a signal-to-noise ratio (SNR), a signal-to-interference-and-noise ratio (SINR), and a channel quality indicator (CQI).

12. An apparatus for wireless communication, comprising:
a processor,
memory in electronic communication with the processor; and
instructions stored in the memory and executable by the processor to cause the apparatus to:
identify a first set of transmit beams and an associated first set of receive beams having a value of a channel characteristic that is below a first threshold;
identify, for each receive beam in the first set of receive beams, a transmit beam in a second set of transmit beams having a value of the channel characteristic above a second threshold;
identify a relative channel characteristic value between each transmit beam in the first set of transmit beams and each transmit beam in the second set of transmit beams; and
transmit a message that identifies the beams in the first and second set of transmit beams, the identified receive beam from the first set of receive beams for each beam in the first set of transmit beams, and the relative channel characteristic values.

13. The apparatus of claim 12, wherein the instructions are further executable by the processor to cause the apparatus to:
identify a third set of transmit beams having a value of the channel characteristic that is above the first threshold and below a third threshold, the third threshold being lower than the second threshold; and
identify the relative channel characteristic value from a beam in the third set of transmit beams and each beam in the second set of transmit beams.

14. The apparatus of claim 13, wherein the instructions are further executable by the processor to cause the apparatus to:
identify a threshold value associated with the relative channel characteristic value; and
identify the relative channel characteristic based at least in part on the threshold value.

15. The apparatus of claim 13, wherein the instructions are further executable by the processor to cause the apparatus to:
transmit the message that further identifies the beams in the third set of transmit beams and, for each beam, an associated channel characteristic value.

16. The apparatus of claim 12, wherein the channel characteristic comprises one or more of a received signal reference power (RSRP), a received signal reference quality (RSRQ), a signal-to-noise ratio (SNR), a signal-to-interference-and-noise ratio (SINR), and a channel quality indicator (CQI).

\* \* \* \* \*